(12) United States Patent
Shigeta

(10) Patent No.: US 11,398,134 B2
(45) Date of Patent: *Jul. 26, 2022

(54) FRAUD DETECTION SYSTEM IN A CASINO

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 29 days.

This patent is subject to a terminal disclaimer.

(21) Appl. No.: 16/935,391

(22) Filed: Jul. 22, 2020

(65) Prior Publication Data

US 2020/0349811 A1     Nov. 5, 2020

Related U.S. Application Data

(63) Continuation of application No. 16/202,348, filed on Nov. 28, 2018, now Pat. No. 10,755,524, which is a
(Continued)

(30) Foreign Application Priority Data

Aug. 3, 2015  (JP) ................................ 2015-163213
Oct. 1, 2015  (JP) ................................ 2015-206735

(51) Int. Cl.
    *A63F 9/24*     (2006.01)
    *A63F 11/00*    (2006.01)
    (Continued)

(52) U.S. Cl.
    CPC ............ *G07F 17/3241* (2013.01); *A63F 1/18* (2013.01); *A63F 3/00157* (2013.01);
    (Continued)

(58) Field of Classification Search
    USPC .............................. 463/1, 20, 22, 25, 30, 39
    See application file for complete search history.

(56) References Cited

U.S. PATENT DOCUMENTS

| 4,026,309 A | 5/1977 | Howard |
| 5,361,885 A | 11/1994 | Modler |

(Continued)

FOREIGN PATENT DOCUMENTS

| CN | 101495198 A | 7/2009 |
| CN | 101620669 A | 1/2010 |

(Continued)

OTHER PUBLICATIONS

Korean Notice of Allowance dated Sep. 16, 2021 issued for KR Application No. 10-2021-0071384.
(Continued)

*Primary Examiner* — Adetokunbo O Torimiro
(74) *Attorney, Agent, or Firm* — Norton Rose Fulbright US LLP

(57) ABSTRACT

A fraud detection system which detects fraud in a game of performing collection and redemption of chips in accordance with a win or lose result includes a camera which captures an image of chips contained in a chip tray of a dealer, an image analyzing apparatus which analyses the image captured by the camera to detect an amount of the chips contained in the chip tray, a card distribution device which determines a win or lose result of a game, and a control device which compares the win or lose result of the game and the amount of the chips contained in the chip tray before and after collection and redemption of the chips to detect fraud.

25 Claims, 28 Drawing Sheets

Related U.S. Application Data continuation of application No. 16/016,128, filed on Jun. 22, 2018, now Pat. No. 10,593,154, which is a continuation of application No. 15/226,200, filed on Aug. 2, 2016, now Pat. No. 10,032,335.

(51) Int. Cl.

| | | |
|---|---|---|
| *G06F 13/00* | (2006.01) | |
| *G06F 17/00* | (2019.01) | |
| *G07F 17/32* | (2006.01) | |
| *A63F 1/18* | (2006.01) | |
| *A63F 3/00* | (2006.01) | |
| *G06Q 50/34* | (2012.01) | |
| *A63F 1/14* | (2006.01) | |
| *A63F 1/00* | (2006.01) | |

(52) U.S. Cl.
CPC ............ *G06Q 50/34* (2013.01); *G07F 17/322* (2013.01); *G07F 17/3206* (2013.01); *G07F 17/3223* (2013.01); *G07F 17/3248* (2013.01); *G07F 17/3251* (2013.01); *G07F 17/3293* (2013.01); *A63F 1/14* (2013.01); *A63F 2001/001* (2013.01); *A63F 2250/58* (2013.01)

(56) References Cited

U.S. PATENT DOCUMENTS

| | | | |
|---|---|---|---|
| 5,479,535 | A | 12/1995 | Komatsu |
| 5,651,548 | A | 7/1997 | French et al. |
| 6,234,294 | B1 | 5/2001 | Defeo et al. |
| 6,460,848 | B1 | 10/2002 | Soltys et al. |
| 6,530,837 | B2 | 3/2003 | Soltys et al. |
| 7,213,812 | B2 | 5/2007 | Schubert et al. |
| 7,846,020 | B2 | 12/2010 | Walker et al. |
| 8,342,529 | B2 | 1/2013 | Snow |
| 8,870,073 | B2 | 10/2014 | Detwiller |
| 9,262,885 | B2 | 2/2016 | Moore et al. |
| 9,342,529 | B2 | 5/2016 | Lin et al. |
| 9,361,577 | B2 | 6/2016 | Miyashita |
| 9,779,582 | B1 | 10/2017 | Ben Hanan et al. |
| 10,013,847 | B2 | 7/2018 | Chun |
| 10,201,745 | B2 | 2/2019 | Moore et al. |
| 10,235,730 | B1 | 3/2019 | Stasi et al. |
| 10,366,563 | B2 | 7/2019 | Chun et al. |
| 10,403,090 | B2 | 9/2019 | Shigeta |
| 10,410,475 | B2 | 9/2019 | Grauzer et al. |
| 10,474,513 | B2 | 11/2019 | Yoon et al. |
| 10,529,168 | B2 | 1/2020 | Chun |
| 10,650,550 | B1 | 5/2020 | McClellan et al. |
| 10,930,112 | B2 | 2/2021 | Shigeta |
| 2002/0042298 | A1 | 4/2002 | Soltys et al. |
| 2002/0065130 | A1 | 5/2002 | Soltys et al. |
| 2002/0096827 | A1 | 7/2002 | Markowiak |
| 2002/0111205 | A1 | 8/2002 | Beavers |
| 2003/0139214 | A1 | 7/2003 | Wolf et al. |
| 2004/0213448 | A1 | 10/2004 | Jou et al. |
| 2005/0026680 | A1 | 2/2005 | Gururajan |
| 2005/0051955 | A1 | 3/2005 | Schubert et al. |
| 2005/0051965 | A1 | 3/2005 | Gururajan |
| 2005/0272501 | A1 | 12/2005 | Tran et al. |
| 2006/0019739 | A1 | 1/2006 | Soltys et al. |
| 2006/0108736 | A1 | 5/2006 | Walker et al. |
| 2006/0128472 | A1 | 6/2006 | Beavers |
| 2006/0160600 | A1 | 7/2006 | Hill et al. |
| 2006/0160608 | A1 | 7/2006 | Hill et al. |
| 2006/0177109 | A1 | 8/2006 | Storch |
| 2006/0252521 | A1 | 11/2006 | Gururajan et al. |
| 2006/0287068 | A1 | 12/2006 | Walker et al. |
| 2007/0015583 | A1 | 1/2007 | Tran |
| 2007/0077987 | A1 | 4/2007 | Gururajan et al. |
| 2007/0111773 | A1 | 5/2007 | Gururajan |
| 2007/0136741 | A1 | 6/2007 | Stattenfield |
| 2007/0184898 | A1 | 8/2007 | Milier et al. |
| 2008/0076529 | A1 | 3/2008 | Richards et al. |
| 2008/0113783 | A1 | 5/2008 | Czyzewski et al. |
| 2009/0104981 | A1 | 4/2009 | Koyama |
| 2009/0115133 | A1 | 5/2009 | Kelly |
| 2009/0118006 | A1 | 5/2009 | Kelly et al. |
| 2009/0131151 | A1 | 5/2009 | Harris et al. |
| 2009/0140492 | A1 | 6/2009 | Yoseloff et al. |
| 2009/0169094 | A1 | 7/2009 | Tsai |
| 2009/0186678 | A1 | 7/2009 | Amaitis et al. |
| 2009/0201372 | A1 | 8/2009 | O'Doherty et al. |
| 2009/0233699 | A1 | 9/2009 | Koyama |
| 2009/0291762 | A1 | 11/2009 | Walker |
| 2010/0016050 | A1 | 1/2010 | Snow et al. |
| 2010/0062845 | A1 | 3/2010 | Wadds et al. |
| 2010/0130282 | A1 | 5/2010 | Bradshaw |
| 2010/0171267 | A1 | 7/2010 | Walker |
| 2010/0240446 | A1 | 9/2010 | Koyama et al. |
| 2010/0331085 | A1 | 12/2010 | Nagano |
| 2011/0028204 | A1 | 2/2011 | Schwartz |
| 2011/0052049 | A1 | 3/2011 | Rajaraman et al. |
| 2011/0238510 | A1 | 9/2011 | Rowen et al. |
| 2012/0040727 | A1 | 2/2012 | Gururajan et al. |
| 2012/0080845 | A1 | 4/2012 | Emori |
| 2012/0115590 | A1 | 5/2012 | Rowe |
| 2012/0252564 | A1 | 10/2012 | Moore et al. |
| 2012/0276969 | A1 | 11/2012 | Watanabe |
| 2013/0277911 | A1 | 10/2013 | Shigeta |
| 2013/0316797 | A1 | 11/2013 | Gelinotte et al. |
| 2013/0320097 | A1 | 12/2013 | Anderson, II et al. |
| 2014/0094298 | A1 | 4/2014 | Lyons |
| 2014/0194199 | A1 | 7/2014 | DiGiovanni |
| 2014/0243651 | A1 | 8/2014 | Kim et al. |
| 2014/0291399 | A1 | 10/2014 | Koyama |
| 2014/0343404 | A1 | 11/2014 | Razzaque et al. |
| 2015/0024818 | A1 | 1/2015 | Chun |
| 2015/0036920 | A1 | 2/2015 | Wu et al. |
| 2015/0087417 | A1 | 3/2015 | George et al. |
| 2015/0189239 | A1 | 7/2015 | Zhao et al. |
| 2015/0190707 | A1 | 7/2015 | Shigeta |
| 2015/0312517 | A1 | 10/2015 | Hoyt et al. |
| 2015/0356811 | A1 | 12/2015 | Koyama |
| 2016/0098606 | A1 | 4/2016 | Nakamura et al. |
| 2016/0171336 | A1 | 6/2016 | Schwartz |
| 2016/0328913 | A1 | 11/2016 | Blazevic |
| 2017/0018140 | A1 | 1/2017 | Yamaguchi et al. |
| 2017/0039807 | A1 | 2/2017 | Shigeta |
| 2017/0193735 | A1 | 7/2017 | Mandava et al. |
| 2018/0053377 | A1 | 2/2018 | Shigeta |
| 2018/0061178 | A1 | 3/2018 | Shigeta |
| 2018/0075690 | A1 | 3/2018 | Moore et al. |
| 2018/0122187 | A1 | 5/2018 | Moore et al. |
| 2018/0247134 | A1 | 8/2018 | Bulzacki et al. |
| 2019/0108710 | A1 | 4/2019 | French et al. |
| 2019/0156623 | A1 | 5/2019 | Thomas et al. |
| 2019/0172312 | A1 | 6/2019 | Shigeta |
| 2019/0236891 | A1 | 8/2019 | Shigeta |
| 2020/0053434 | A1 | 2/2020 | Kudelski et al. |
| 2020/0273287 | A1 | 8/2020 | Shigeta |
| 2020/0349797 | A1 | 11/2020 | Moore et al. |

FOREIGN PATENT DOCUMENTS

| | | |
|---|---|---|
| CN | 101958892 A | 1/2011 |
| CN | 102125756 A | 7/2011 |
| CN | 102089046 A | 8/2011 |
| CN | 102441273 A | 5/2012 |
| CN | 102892472 A | 1/2013 |
| CN | 102945366 A | 2/2013 |
| CN | 103189112 A | 7/2013 |
| CN | 103592016 A | 2/2014 |
| JP | 64-500243 | 2/1989 |
| JP | H03-102917 | 10/1991 |
| JP | H06-134140 U | 5/1994 |
| JP | 2000-259796 A | 9/2000 |
| JP | 2002-007989 A | 1/2002 |
| JP | 2005-144032 A | 6/2005 |
| JP | 2005-312510 A1 | 11/2005 |
| JP | 2005342175 A | 12/2005 |
| JP | 2007-164401 A | 6/2007 |
| JP | 2008-077140 A | 4/2008 |

(56) References Cited

FOREIGN PATENT DOCUMENTS

| | | | |
|---|---|---|---|
| JP | 2009-018021 A | 1/2009 |
| JP | 2009-066172 A | 4/2009 |
| JP | 2009-066173 A | 4/2009 |
| JP | 2009165835 A | 7/2009 |
| JP | 2009-219588 A | 10/2009 |
| JP | 2010-128915 A | 6/2010 |
| JP | 2010-187807 A | 9/2010 |
| JP | 2010213940 A | 9/2010 |
| JP | 2011-067339 A | 4/2011 |
| JP | 2012075781 A | 4/2012 |
| JP | 2012-174222 A | 9/2012 |
| JP | 2013-198626 A | 10/2013 |
| JP | 2014504164 A | 2/2014 |
| JP | 2014-140576 A | 8/2014 |
| JP | 2014-203139 A | 10/2014 |
| JP | 2015014819 A | 1/2015 |
| JP | 2016110232 A | 6/2016 |
| JP | 6855429 B2 | 3/2021 |
| JP | 6855430 B2 | 3/2021 |
| KR | 1019920019198 A | 10/1992 |
| KR | 20030064124 A | 7/2003 |
| KR | 20070009132 A | 1/2007 |
| KR | 1020070119105 A | 12/2007 |
| KR | 1020140108417 A | 9/2014 |
| WO | 2007/011188 A1 | 1/2007 |
| WO | 2008063361 A2 | 5/2008 |
| WO | 2008/120749 A | 10/2008 |
| WO | 2012058401 A2 | 5/2012 |
| WO | 2012161422 A1 | 11/2012 |
| WO | 2014049664 A1 | 4/2014 |
| WO | 2014/182306 A1 | 11/2014 |
| WO | 2014210368 A1 | 12/2014 |
| WO | 2015096677 A1 | 7/2015 |
| WO | 2015107902 A1 | 7/2015 |

OTHER PUBLICATIONS

U.S. Office Action dated Jun. 30. 2021 issued in U.S. Appl. No. 16/934,283 cites the patent documents above.
Chinese Office Action dated Jul. 8, 2021 issued in CN Application No. 202010093251.4 cites the patent documents above.
U.S. Office Action dated Aug. 2, 2021 issued in U.S. Appl. No. 17/004,492 cites the patent documents above.
Malaysian Modified Substantive Examination Report dated Oct. 29, 2021 issued for MY Application No. PI2018000152.
Office Action dated Nov. 18, 2020 for CN 201811441330.9.
Office Action dated Dec. 9, 2020 for KR 10-2020-0124628.
Australian Examination Report No. 3 dated Apr. 16, 2021 for AU Application No. 2016302657.
International Search Report, PCT/JP2016/072671, dated Oct. 25, 2016.
First Examination Report dated Aug. 14, 2017 for New Zealand Application 722828.
Written Opinion dated Sep. 11, 2017 for Singapore Application 10201606360.
Written Opinion dated Oct. 30, 2017 for Singapore Application 10201706673P.
Office Action dated Nov. 22, 2017 for U.S. Appl. No. 15/226,200.
Office Action dated Dec. 7, 2017 for Macau Application I/001450.
Office Action dated Feb. 13, 2018 for Japanese Application 2016-151812.
Examiner's Report dated Apr. 23, 2018 for Australian Application 2017208255.
Examination Report No. 2 dated Jun. 8, 2018 for Australian Application 2016210614.
First Examination Report dated Jul. 12, 2018 for New Zealand Application 740620.
Office Action dated Nov. 29, 2018 for U.S. Appl. No. 16/100,807.
Office Action dated Dec. 11, 2018 for U.S. Appl. No. 16/100,831.
Japanese Office Action dated Feb. 19, 2019 for JP Application 2018-076921.
Japanese Office Action dated Feb. 19, 2019 for JP Application 2018-076922.
Notice of Allowance dated May 22, 2020 for corresponding/family U.S. Appl. No. 16/395,414 cites the patent documents above.
U.S. Office Action dated May 1, 2020 for corresponding/family U.S. Appl. No. 16/509,723 cites the patent documents above.
New Zealand dated Mar. 19, 2020 for corresponding/family NZ Application 757091 cites the patent documents above.
U.S. Office Action dated Mar. 26, 2020 for corresponding/family U.S. Appl. No. 16/564,440 cites the patent documents above.
U.S. Notice of Allowance dated Mar. 26, 2020 for corresponding/family U.S. Appl. No. 16/270,824 cites the patent documents above.
First Examination Report dated Jan. 28, 2020 for corresponding NZ Application 755281.
Office Action dated Nov. 26, 2019 for related U.S. Appl. No. 16/509,780.
Office Action dated Sep. 25, 2019 for U.S. Appl. No. 16/509,723 which cites the documents herein.
Office Action dated Jul. 30, 2019 for JP Application No. 2018-211053, which cites the JP references herein.
Office Action dated May 29, 2019 for U.S. Appl. No. 15/749,643, which cites the US references herein.
Office Action dated Jun. 10, 2019 for CN Application 201710622633, which cites the CN references herein.
International Application No. PCT/JP2017/025796, International Search Report dated Oct. 3, 2017.
International Search Report, PCT/JP2016/072673, dated Oct. 25, 2016.
Office Action dated Nov. 12, 2019 for U.S. Appl. No. 16/202,290.
U.S. Office Action dated Jul. 22, 2020 for corresponding/family U.S. Appl. No. 16/460,072 cites the patent documents above.
AU Office Action dated Aug. 28, 2020 for corresponding/family Australian Application 2019204560 cites the patent documents above.
NZ Office Action dated Sep. 15, 2020 for corresponding/family New Zealand Application 755281 cites the patent documents above.
Office Action dated Sep. 29, 2020 for JP Application No. 2019-113061.
Office Action dated Jun. 26, 2020 for U.S. Appl. No. 16/395,457.
Office Action dated Oct. 6, 2020 for JP Application No. 2019-212469.
Office Action dated Oct. 6, 2020 for JP Application No. 2017-533090.
U.S. Office Action dated Aug. 9, 2021 issued in U.S. Appl. No. 16/987,710 cites the patent documents above.
CN Office Action dated Aug. 3, 2021 issued in CN Application No. 201811441041.9 cites the patent documents above.
Japanese Notice of Allowance dated Sep. 7, 2021 issued for JP Application No. 2020-109845.
Chinese 2nd Office Action dated Dec. 30, 2021 issued for CN Application No. 202010093251.4.
Korean Office Action dated Jan. 13, 2022 issued for KR Application No. 10-2021-0190519.
Japanese Office Action dated Jan. 25, 2022 issued for JP Application No. 2021-044180.
Japanese Office Action dated Jan. 25, 2022 issued for JP Application No. 2021-044181.
U.S. Office Action dated Mar. 3, 2022 issued for U.S. Appl. No. 16/870,028.
U.S. Notice of Allowance dated Apr. 11, 2022 issued for U.S. Appl. No. 17/034,492.
Japanese Office Action dated Apr. 26, 2022 issued for JP Application No. 2019-113061.
Korean Notice of Allowance dated Apr. 29, 2022 issued for KR Application No. 10-2021-0190517.
Chinese Office Action dated May 23, 2022 issued for CN Application No. 202010093251.4.

FIG.19

| COMBINATION | MARKS | OUTPUT OF SENSORS |
|---|---|---|
| 1 | ☐ — BLANK<br>☐ — BLANK | OFF<br>OFF |
| 2 | ☐ — BLANK<br>▩ — M | OFF<br>ON ⎍ OFF |
| 3 | ▩ — M<br>☐ — BLANK | ON ⎍ OFF<br>OFF |
| 4 | ▩ — M<br>▩ — M | ON ⎍ OFF<br>ON ⎍ OFF |

FRAUD DETECTION SYSTEM IN A CASINO

CROSS-REFERENCE TO RELATED APPLICATION

This application is a continuation of U.S. application Ser. No. 16/202,348 filed Nov. 28, 2018, which is a continuation of U.S. application Ser. No. 16/016,128 filed Jun. 22, 2018 (now U.S. Pat. No. 10,593,154), which is a continuation of U.S. application Ser. No. 15/226,200 filed Aug. 2, 2016 (now U.S. Pat. No. 10,032,335), which claims the benefit of JP Application No. 2015-163213 filed Aug. 3, 2015 and JP Application No. 2015-206735 filed Oct. 1, 2015; the disclosure of each of which is incorporated herein by reference in its entirety.

BACKGROUND

Technical Field

The present invention relates to a system for detecting fraud in a game in a casino or an error or fraud at the time of wagering chips or doing settlement.

Related Art

Casinos are attempting to prevent various types of fraud. The casino is equipped with a surveillance camera for surveilling fraud to prevent fraud by determining fraud of a game, fraud of a win or lose result, or fraud of collection or redemption of chips from images from the surveillance cameras.

On the other hand, in order to the number or total amount of wagered chips, proposed is a technique of attaching an wireless IC (RFID) tag to each chip to recognize the amount of the chip.

In a card game monitoring system disclosed in WO 2015/107902 A, fraud monitoring is performed by determining through image analysis of movement of chips whether or not the chips placed on a gaming table are collected or redeemed in accordance with a win or lose result.

SUMMARY

The invention is to provide a new system for detecting fraud in a game in a casino or an error or fraud at the time of wagering chips or doing settlement.

According to an aspect of the invention, there is provided a fraud detection system in a casino having a plurality of gaming tables, including: a game recording apparatus which records a progress of a game played in the gaming table as an image; an image analyzing apparatus which performs image analysis on the image of the recorded progress of the game; a win/lose result determining apparatus which determines a win or lose result of each game in the gaming table; and a control device which detects fraud practiced in the gaming table by using a result of the image analysis by the image analyzing apparatus and the win or lose result determined by the win/lose result determining apparatus, wherein the control device recognizes a position, type, and number of the chips wagered by each player through the image analyzing apparatus and recognizes a total amount of chips in a chip tray of a dealer of the gaming table, performs addition/subtraction calculation of an increased/decreased amount of the chips in the game calculated from the position, type, and number of the chips wagered by all the players in the game and the win or lose result of the game obtained from the win/lose result determining apparatus from the total amount of the chips in the chip tray before the settlement of each game and compares a correct total amount of the chips in the chip tray after end of the game and settlement and an actual total amount of the chips in the chip tray at the time of the end of the game obtained through the image analyzing apparatus to determine whether or not there is difference between the correct total amount and the actual total amount.

In the above fraud detection system, the control device may recognize the position, type, and number of the chips wagered by each player through the image analyzing apparatus, recognize the actual total amount of the chips in the chip tray at the time when the collection of all the amount of the lost chips wagered by each player is ended, and compare the correct total amount of the chips in the chip tray added with the increased amount of the chips in the chip tray in the game from the position, type, and number of the chips wagered by the lost player from the total amount of the chips in the chip tray before the settlement of each game and the actual total amount of the chips in the chip tray to determine whether or not there is difference between the correct total amount and the actual total amount.

In the above fraud detection system, in the case where the control device compares the correct total amount of the chips in the chip tray added with the increased amount of the chips in the chip tray in the game from the position, type, and number of the chips wagered by the lost player from the total amount of the chips in the chip tray before the settlement of each game and the actual total amount of the chips in the chip tray and determines that there is no difference between the correct total amount and the actual total amount and the control device compares the correct total amount of the chips in the chip tray after the end of the game and the settlement and the actual total amount of the chips in the chip tray obtained through the image analyzing apparatus at the time of the end of the game and determines that there is difference between the correct total amount and the actual total amount, the control device may determine a mistake in payment and generate a payment mistake signal indicating the mistake in payment.

In the above fraud detection system, the chip tray may be provided with a collection chip tray where the chips wagered by the lost player are collected and temporarily stored, and the image analyzing apparatus and the control device may compare the correct amount of chips in the collection chip tray calculated from the position, type, and number of the chips wagered by the lost player and the actual total amount of the chips in the collection chip tray to determine whether or not there is difference between the correct total amount in the collection chip tray and the actual total amount.

In the above fraud detection system, acquisition of the actual total amount in the chip tray after the end of the game and the settlement through the image analyzing apparatus may be performed any one of: 1) the time when redemption for the winning chips is ended; 2) the time when the cards used in the game are collected to be discarded into a discard area of the table; 3) the time when a predetermined button attached to the win/lose result determining apparatus is pushed; and 4) the time when a marker representing win or lose is returned to an initial state.

In the above fraud detection system, when the control device determines that there is difference that the recognized actual total amount of the chips in the chip tray of the dealer of the gaming table does not match with the increased/decreased amount of the chips calculated from the amount of the chips wagered by all the players and the win or lose result of the game, the game recording apparatus may be configured to be capable of allocating indexes or time points to the acquired images or reproducing the images specified with a collection scene or a redemption scene of the chips so that the record of the game where the difference occurs can be analyzed in the game recording apparatus.

In the above fraud detection system, the image analyzing apparatus or the control device may have a structure where, although a portion of or the entire chips among a plurality of the chips placed on the gaming table is concealed due to a blind spot of the camera, information on the type, number, and position of the wagered chips can be obtained.

In the above fraud detection system, the control device may have a structure capable of: 1) recognizing the position, type and number of the chips wagered in each play position of the game table and comparing the history of win and lose of each player obtained from the win or lose result of each game and the amount of the acquired chips and the statistical data of previous games to extract a strange situation; and 2) comparing a state that, at a play position of a certain gaming table, the amount of betting chips at the lost time is smaller than the amount of betting chips at the win time and the statistical data of previous games to extract a strange situation.

In the above fraud detection system, the control device may perform comparison determination as to whether or not the recognized amount of chips in the chip tray of the dealer of the gaming table is increased or decreased according to the paid amount of the chips corresponding to the exchanged cash or the paid amount of the cash corresponding to the exchanged chips after the exchange of cash and chips.

In the above fraud detection system, the control device may be further provided with database storing history of exchange of cash and the chips, and by referring to the database in unit of a predetermined time or a day, and the control device may be capable of performing comparison determination as to whether or not the recognized amount of the chips in the chip tray of the dealer of the gaming table is increased or decreased according to the paid amount of the chips corresponding to the exchanged cash or the total amount of the paid amount of the cash corresponding to the exchanged chips.

In the above fraud detection system, the control device may be capable of specifying a player of the play position extracted as the difference or the strange situation through the image analyzing apparatus.

In the above fraud detection system, the control device may have a caution function of informing about the existence of the specified player in another gaming table when the specified player departs and arrives at the other gaming table.

In the above fraud detection system, the control device may have at least one of functions of determining as to: 1) whether or not there is movement of chips during the time interval from the start of extraction of cards or from the game start operation of the dealer before the win or lose result of the game is displayed by the card distribution device in each game; 2) whether or not there is movement of chips by a person other than the dealer during the time interval when the dealer collects chips wagered by the losers among the game participants after the end of each game; 3) whether or not a chip is added during the time interval when the dealer collects chips wagered by the losers among the game participants after the end of each game; 4) whether or not the dealer performs payment for a position of chips wagered by the winner among the game participants after the end of each game; and 5) whether or not the winner among the game participants receives wagered chips and paid chips after the end of each game.

In the above fraud detection system, the win/lose result determining apparatus may be a card distribution device which distributes the cards in the gaming table or a control device which determines the win or lose result of each game from information of the image analyzing apparatus reading the cards distributed in the gaming table by using a camera.

According to the fraud detection system of the invention, it is possible to detect fraud in collection and redemption of chips in accordance with a win or lose result of a game.

In addition, according to the system of the invention, although the cards are slanted by "card squeegee" frequently performed by players in a baccarat game or the like, the rank and suit of the cards can be determined by image analysis, so that the total amount of chips being overlapped or being in a blind spot together with the positions can be recognized. In addition, fraud at the time of exchanging cash and chips can be detected.

BRIEF DESCRIPTION OF DRAWINGS

FIG. 19 is a diagram illustrating a relationship between output wave forms of sensors and marks in the card distribution device in the second embodiment of the invention.

DETAILED DESCRIPTION

Figure 1:
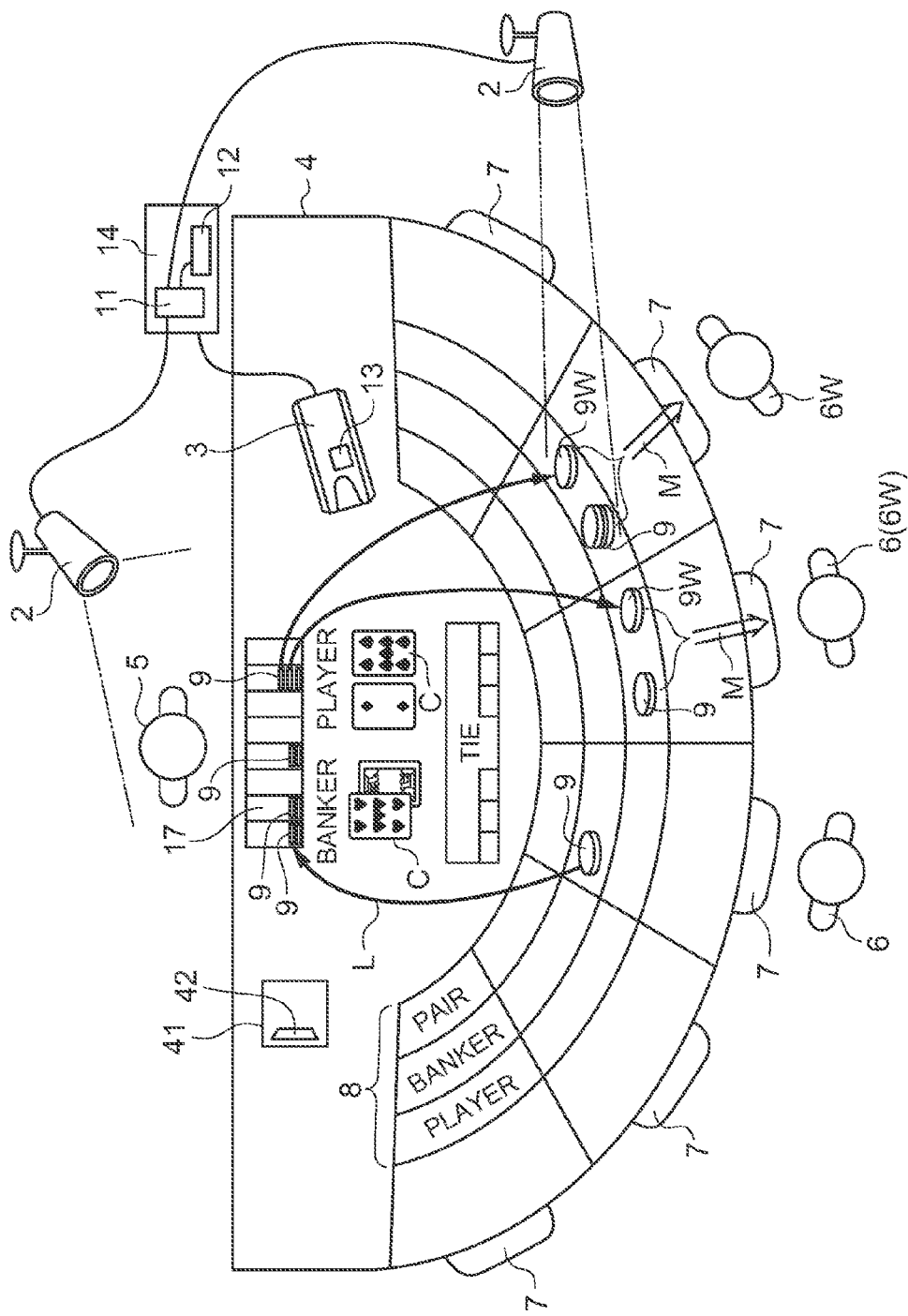
FIG. 1 is a diagram illustrating an overview of a fraud detection system in a casino having a plurality of gaming tables according to a first embodiment of the invention.

In a casino such as a casino, highly stacked chips are placed on a gaming table, and thus, there is a problem in that a total amount of the chips cannot be accurately read by an IC tag reading device provided under the gaming table. If the sensitivity of the reading device is heightened, chips placed at other positions (win or lose depends on the position) may be added, and thus, there is a problem in that the total amount of chips at each position cannot be recognized. In addition, in image capturing of a camera, there is a problem in that the total amount of chips cannot be recognized because a blind spot is formed according to a viewing angle of the camera, or entering into a shadow caused by overlap.

In addition, if cards are slanted by "card squeegee" (behavior of bending a face-down card to enjoying a rank of the card little by little) or the like which is frequently performed by players in a baccarat game, there is a problem in that ranks and suits of cards cannot be determined through image analysis using cameras.

In addition, fraud in the gaming table is further more sophisticated, and thus, there is a new problem in that fraud by an advanced betting method which cannot be found through simple detection of largeness or the like in the winning amount in the gaming table cannot be detected by the camera or by tracking the winning amount. In addition, fraud according to conspiracy of a dealer and a player is not sufficiently prevented in the related art.

In order to solve the above-described problems, in a first embodiment, a fraud detection system in a casino having a plurality of gaming tables is configured to include a game recording apparatus which records a progress of a game played in the gaming table including a dealer and a player as an image through a camera, an image analyzing apparatus which performs image analysis on the image of the recorded progress of the game, a card distribution device which determines a win or lose result of each game in the gaming table, and a control device which detects fraud practiced in the gaming table by using a result of the image analysis by the image analyzing apparatus and a win or lose result determined by the card distribution device.

In addition, in the fraud detection system, the card distribution device has a structure capable of reading ranks of the cards distributed. The control device has a structure capable of determining match or mismatch by checking information on the rank obtained from the image of each card distributed in the gaming table by the image analyzing apparatus and information on the rank of the card read by the card distribution device.

In addition, in the fraud detection system, the image analyzing apparatus or the control device has an artificial intelligence utilizing type structure or a deep learning structure capable of obtaining information on rank of a card from the card which is distributed in the gaming table and is folded or stained by a player.

In addition, in the fraud detection system, the control device recognizes positions, types, and numbers of chips wagered by players through the image analyzing apparatus and determines by image analysis of a progress of the game through the image analyzing apparatus whether or not the collection of the lost chips wagered by each player and the redemption for the winning chips are correctly performed in accordance with a win or lose result of the game.

In addition, in the fraud detection system, the image analyzing apparatus or the control device has an artificial intelligence utilizing type structure or a deep learning structure where, although a portion of or the entire chips among a plurality of the chips placed on the gaming table is concealed due to a blind spot of the camera, the information on the type, number, and position of the wagered chips can be obtained.

In addition, in the fraud detection system, the control device has an artificial intelligence utilizing type structure or a deep learning structure where comparison calculation according to the win or lose result of the game can be performed on whether or not the recognized amount of the chips in the chip tray of the dealer of the gaming table is increased/decreased according to the collected amount of the lost chips wagered by each player and the paid amount of the winning chips after the end of the game and the settlement.

In addition, in the fraud detection system, the control device has an artificial intelligence utilizing type structure or a deep learning structure capable of recognizing the position and amount of the chips wagered in each play position of the game table and comparing the history of win and lose of each player obtained from the win or lose result of each game and the amount of the acquired chips and the statistical data of previous games to extract a strange situation.

In addition, in the fraud detection system, the control device has an artificial intelligence utilizing type structure or a deep learning structure capable of comparing a state that, at a play position of a certain gaming table, the amount of betting chips at the lost time is smaller than the amount of betting chips at the win time and the statistical data of previous games to extract a strange situation.

In addition, in the fraud detection system, the control device has a structure capable of extracting the strange situation through the image analyzing apparatus or specifying individual players at the player positions where winning of a predetermined amount or more occurs.

In addition, in the fraud detection system, the control device has a caution function of informing about the existence of the specified player in another gaming table when the specified player departs and arrives at the other gaming table.

In order to solve the above-described problems, according the invention, there is provided a fraud detection system in a casino having a plurality of gaming tables is configured to include a game recording apparatus which records a progress of a game played in the gaming table including a dealer and a player as an image through a camera, a card distribution device which determines a win or lose result of each game in the gaming table, an image analyzing apparatus which performs image analysis on the image of the recorded progress of the game, and a control device which can detect cash and chips in the game table by using a result of the image analysis by the image analyzing apparatus.

The image analyzing apparatus or the control device has an artificial intelligence utilizing type structure or a deep learning structure capable of detecting the exchange of cash and chips in the gaming table in a situation other than the state that the dealer is dealing based on information from the card distribution device or the dealer, capable of recognizing the total amount of the cash which is genuine cash verified by black light and recognizing the total amount of the chips even in the state that a portion of or entire one chip among a plurality of the chips placed on the gaming table as an exchange object is concealed due to a blind spot of the camera, and capable of comparing the total amount of cash placed on the gaming table by the player and the total amount of chips placed by the dealer to determine whether or not the two amounts match with each other.

In addition, in the fraud detection system, the control device has an artificial intelligence utilizing type structure or a deep learning structure capable of performing comparison calculation as to whether or not the recognized amount of chips in a chip tray of a dealer of the gaming table is increased or decreased according to a paid amount of the chips corresponding to the exchanged cash after exchange of cash and chips for settlement.

In addition, in the fraud detection system, the control device has an artificial intelligence utilizing type structure or a deep learning structure where, after the exchange of the cash and the chips for settlement, comparison calculation of match or mismatch between the input amount of the cash according to the input by the dealer and the total amount of the cash according to the result of the image analysis by the image analyzing apparatus can be performed. In addition, the control device has an artificial intelligence utilizing type structure or a deep learning structure capable of performing comparison calculation of match or mismatch between the total input amount of the cash according to the input by the dealer in the gaming table for which the dealer is responsible and the total amount of the cash according to the result of the image analysis by the image analyzing apparatus.

According to the fraud detection system of the embodiment, although the cards are slanted by "card squeegee" frequently performed by players in a baccarat game or the like, the rank and suit of the cards can be determined by image analysis, so that the total amount of chips being overlapped or being in a blind spot together with the positions can be recognized. In addition, fraud at the time of exchanging cash and chips can be detected.

Hereinafter, an overview of the fraud detection system in the casino having a plurality of the gaming tables in the first embodiment will be described more in detail. FIG. 1 is a diagram illustrating the overview of the system. The fraud detection system in a casino having a plurality of gaming tables 4 is configured to include a game recording apparatus 11 which records a progress of a game played in the gaming table 4 including a player (game participant) 6 and a dealer 5 as an image through a plurality of cameras 2, an image analyzing apparatus 12 which performs image analysis on the recorded image of the progress of the game, and a card distribution device 3 which has a function of determining a win or lose result of each game in the gaming table 4 and displaying the win or lose result. The card distribution device 3 is a so-called electronic shoe used by the skilled in the art and has a structure where a game rule is programmed in advance and win or lose of the game can be determined by reading information of the cards C distributed. For example, in a baccarat game, banker win, player win, or tie is basically determined by a rank of two or three cards, and a determination result (win or lose result) is displayed by a result display lamp 13.

The fraud detection system is configured to further include a control device 14 which compares the actual rank of the cards according to the result of the image analysis by the image analyzing apparatus 12 and the win or lose result determined by the card distribution device 3 to detect fraud (for example, mismatch between a sum of ranks of distributed cards and a win or lose result) performed in the gaming table 4. The card distribution device 3 has a structure capable of reading rank (A, 2 to 10, J, Q, K) and suit (heart, spade, or the like) of the card C manually distributed by the dealer 5. The control device 14 has a structure capable of determining match or mismatch by checking information on rank and suit obtained from the image (captured by using the camera 2) of each card distributed in the gaming table 4 by the image analyzing apparatus 12 (using artificial intelligence) and information on rank and suit read by the card distribution device 3. In this fraud detection system, each of the image analyzing apparatus 12 and the control device 14 has a structure including a computer configured with an integrated or plural components, a program, and a memory in a complex manner.

Figure 4:
FIG. 4 is an enlarged diagram illustrating a mark explaining stains of a card recognized in the first embodiment of the invention.
Figure 5A:
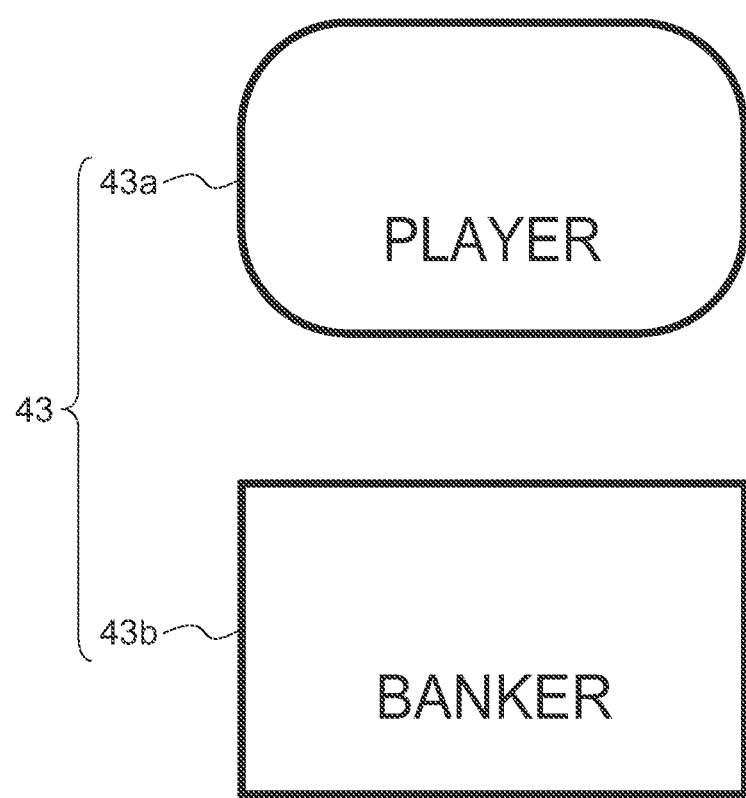
FIG. 5A is a plan diagram illustrating a font side of a marker in the first embodiment of the invention.
Figure 5B:
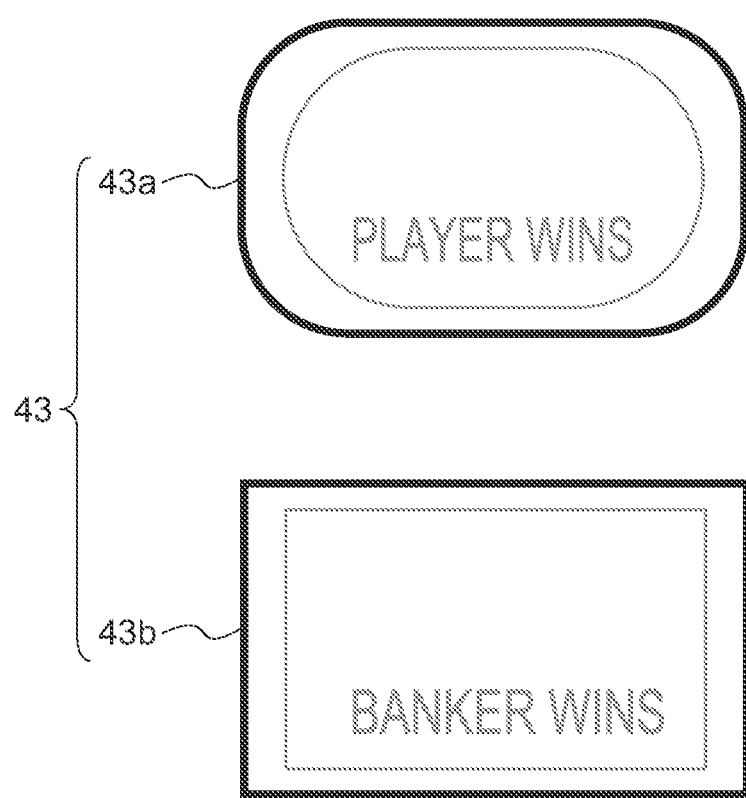
FIG. 5B is a plan diagram illustrating a back side of the marker in the first embodiment of the invention.

Each of the image analyzing apparatus 12 and the control device 14 has an artificial intelligence utilizing type structure or a deep learning structure where, with respect to even a card C which is distributed in the gaming table 4 and is folded or stained by the player 6, information on rank of the card can be obtained. As illustrated in FIG. 4, there occurs a situation where the stained card C is difficult to distinguish clover from spade lt. Even in this case, suit determination can be performed by image analysis and determination using an artificial intelligence utilizing type computer or control system and a deep learning (structure) technique. In addition, although the cards are slanted by "card squeegee" frequently performed by players in a baccarat game or the like, the suits or ranks of the cards before deformation can be recognized by using self-learning or the like of a large number of images in a modified example by artificial intelligence utilizing type computer or control system and a deep learning (structure) technique. Since the artificial intelligence utilizing type computer or control system and a deep learning (structure) technique are well-known and available by the skilled in the art, the description thereof is omitted.

Figure 2A:
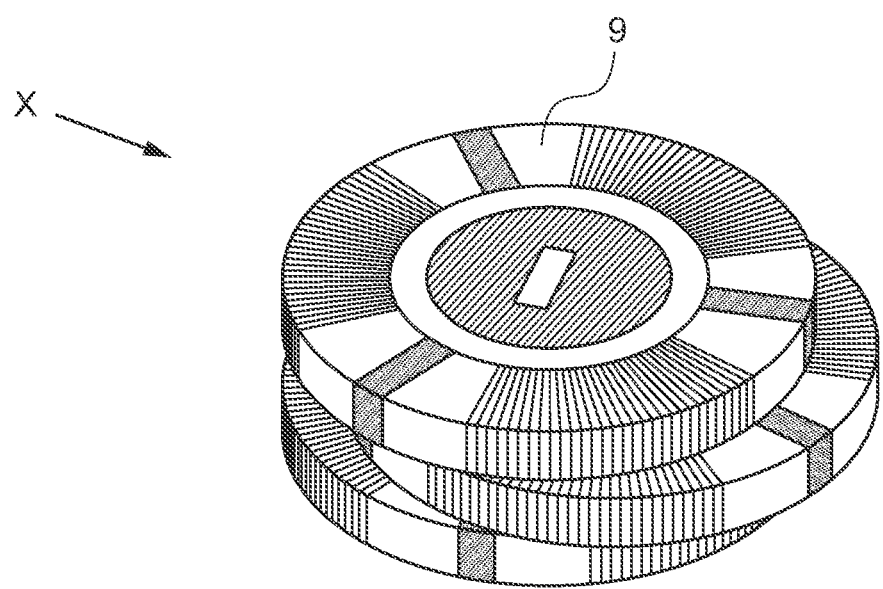
FIG. 2A is a perspective diagram of chips illustrating an example of different overlapped states of chips recognized in the first embodiment of the invention.
Figure 2B:
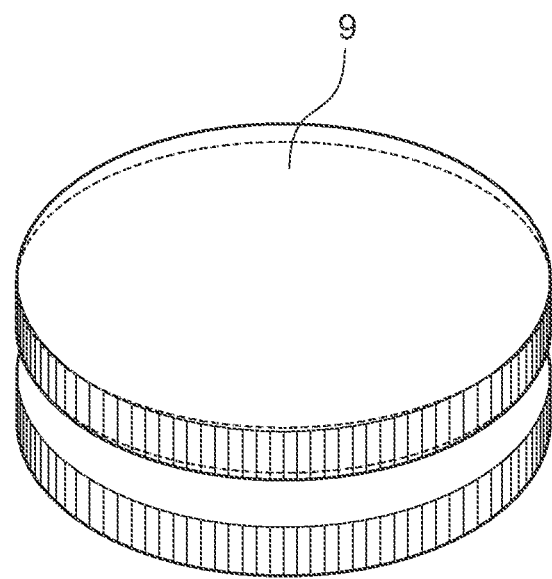
FIG. 2B is a perspective diagram of chips illustrating an example of different overlapped states of chips recognized in the first embodiment of the invention.

The control device 14 having an artificial intelligence utilizing type structure or a deep learning structure can recognize, through the camera 2 and the image analyzing apparatus 12, the position (player, banker, or pair) of the betting area 8 on which the player 6 wagers the chip 9 and the types (different amount values are designated to different colors of the chips 9) and the number of the wagered chips 9. In many case, the chips 9 are not aligned and stacked in the vertical direction, but as illustrated in FIG. 2A, the chips are deviated and overlapped. In this case, it is assumed that, when the camera 2 is disposed in a direction of an arrow X illustrated in FIG. 2A (or when the direction of the chip 9 becomes a blind spot direction relatively), as illustrated in FIGS. 2B, the chip 9 is not seen (in a blind spot). In an artificial intelligence utilizing type computer or control system and a deep learning (structure) technique, by using a self-learning function or the like, concealing or the like (including concealing of a portion of one chip and concealing of the entire chip) of the chip 9 caused by the blind spot is recognized, so that the number of chips or the like can be accurately recognized. In this manner, since which position (player, banker, or pair) of the betting area 8 the chips 9 are wagered on, types of wagered chips 9 (different amount values are designated to different colors of the chips 9), and the number of chips can be recognized, the control device 14 determines by image analysis of a progress of the game through the image analyzing apparatus 12 whether or not collection (indicated by an arrow L) of lost chips wagered by the players 6 and redemption (9W) for wined chips to the winning player 6W are correctly performed in accordance with a win or lose result of the game determined by the card distribution device 3 for each game.

The control device 14 is capable of performing analysis and recognition of the total amount of the chips 9 in the chip tray 17 of the dealer 5 of the gaming table 4 by using the image analyzing apparatus 12 and is capable of performing comparison calculation according to the win or lose result of the game as to whether or not the total amount of the chips 9 in the chip tray 17 is increased or decreased according to the amount of the collection of the lost chips 9 wagered by the players 6 and the redemption (9W) of the winning chips of the winning player 6W after the end of the game and the settlement. Although the total amount of the chips 9 in the chip tray 17 are always checked by means of RFID or the like, whether or not the increased or decreased amount is correct is performed by the control device 14 allowing the image analyzing apparatus 12 to perform image analysis of the progress of the game. An artificial intelligence utilizing type structure or a deep learning structure is used for these configurations.

In this example, since fraud or error is detected based on the information of the win or lose result of the game, information as to what position (player, banker, or pair) of the betting area 8 how many and what type of the chips 9 are wagered on, and the increased/decreased amount of the chips 9 in the chip tray 17 after the collection of the lost chips and the redemption for the winning chips 9, fraud or error can be detected although the recognition of the movement of the chips 9 after the end of the game, that is, the movement of the wagered chips 9 toward the player side or the movement toward the dealer side is not performed.

Herein, for example, in the baccarat, the win or lose result of the game can be determined in accordance with the rule of the baccarat by reading the rank of a card C fed out in the game in the card distribution device 3. In addition, the win or lose result of the game can be determined by capturing an image of the gaming table 4 by using the camera 2, analyzing the image by using the image analyzing apparatus 12, and matching the analysis result with the game rule by using the control device 14. In this case, the camera 2, the image analyzing apparatus 12, and the control device 14 constitute a win/lose result determining apparatus. Information on the players at each play position 7 and information as to what position (player, banker, or pair) of the betting area 8 how many and what type of the chips 9 are wagered on can be obtained by capturing an image of the chips 9 placed on the betting area 8 by using the camera 2 and analyzing the image at each play position 7 by using the image analyzing apparatus 12.

In addition, the increased/decreased amount of the chips 9 in the chip tray 17 before and after the collection of the lost chips 9 and the redemption for the winning chips 9 can be calculated by comparing total amount of the chips 9 in the chip tray 17 before the collection of the lost chips 9 and the redemption for the winning chips 9 and the total amount of the chips 9 in the chip tray 17 after the collection of the lost chips 9 and the redemption for the winning chips 9. The total amount of the chips 9 in the chip tray 17 before the collection of the lost chips 9 and the redemption for the winning chips 9 and the total amount of the chips 9 in the chip tray 17 after the collection of the lost chips 9 and the redemption for the winning chips 9 can be detected by capturing an image of the chip tray 17 containing the chips 9 by using the camera 2 and analyzing the image by using the image analyzing apparatus 12. In addition, the total amount of the chips 9 contained in the chip tray 17 may be detected by burying RFIDs representing the amount is in the chips 9 and providing an RFID reader to the chip tray 17.

For example, the total amount of the chips 9 in the chip tray 17 before the start of the game is denoted by Bb, and the total amount of the chips 9 in the chip tray 17 after the end of the game and the end of the collection of the lost chips and the redemption of the winning chip is denoted by Ba. In addition, in the game, the total amount of the entire play positions 7 in the player area where the chips 9 are wagered is denoted by bp, the total amount of the entire play positions 7 in the banker area where the chips 9 are wagered is denoted by bb, and the total amount of the entire play positions 7 in the tie area where the chips 9 are wagered is denoted by bt. For example, in the case where the win or lose result of the game is banker win, Ba−Bb=bp−bb+bt needs to be satisfied. Alternatively, the total amount Ba of the chips 9 in the chip tray 17 after the end of the game needs to be (Bb+bp−bb+bt). In the case where the above condition is not satisfied, it may be determined that fraud or mistake occurs in the collection of the chips or the redemption for the chips.

Figure 3A:
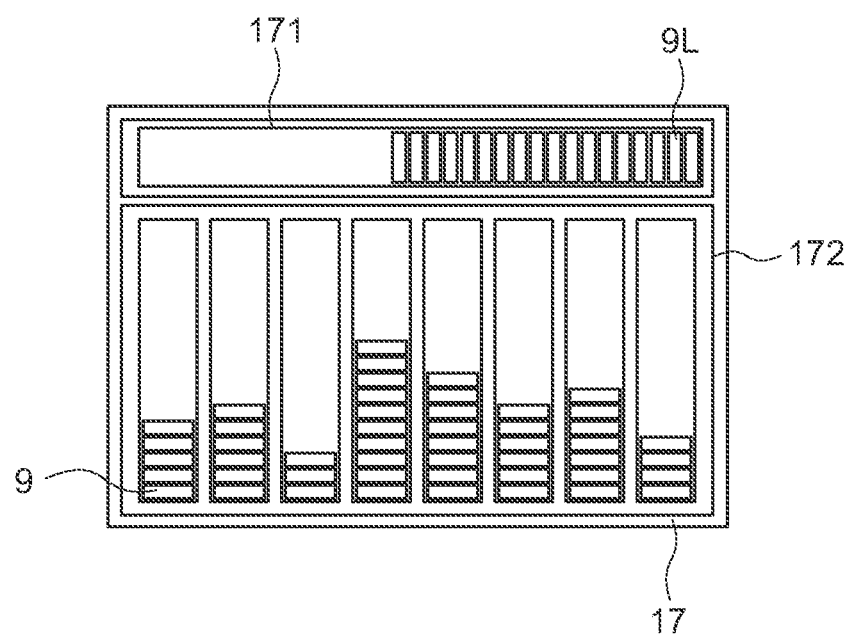
FIG. 3A is a diagram illustrating details of a chip tray in the first embodiment of the invention.
Figure 3B:
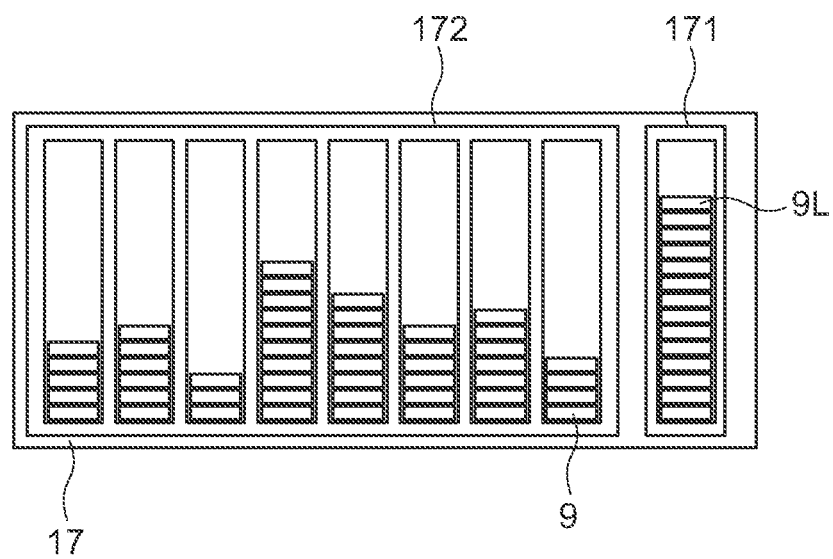
FIG. 3B is a diagram illustrating another example of a chip tray in the first embodiment of the invention.

FIG. 3A is a diagram illustrating details of the chip tray in the embodiment, and FIG. 3B is a diagram illustrating another example of the chip tray. The chip tray 17 is provided with a collection chip tray 171 where the chips 9L wagered by the lost player 6L are collected and temporarily stored and a redemption chip tray 172 where to-be-redeemed chips 9W are stored. The image analyzing apparatus 12 and the control device 14 checks the position, type, and number of the chips 9L wagered by the lost player 6L and calculate the increased amount of the chips 0L in the game (correct amount of the chips 9 in the collection chip tray 171). In addition, the image analyzing apparatus 12 and the control device 14 checks the actual total amount of the chips 9 in the chip tray 171 after the collection and compares the correct total amount and the actual total amount to determine whether or not there is difference.

In addition, the redemption for the chip 9W to the wining player 6W is performed by using the chips 9 in the redemption chip tray 172, and the image analyzing apparatus 12 and the control device 14 can secure an enough time to recognize the actual total amount of the chips 9 in the collection chip tray 171 after the collection.

The gaming table 4 is provided with a discard area 41 and/or a discard slot 42 for discarding the cards C used in the game. When the game is ended, the cards C used in the game are collected and discarded in the discard area 41 or the discard slot 42 on the gaming table 4.

The gaming table 4 is further provided with a marker 43 indicating win or lose of the game. FIG. 4A is a plan diagram illustrating a front side of the marker, and FIG. 4B is a plan diagram illustrating a back side of the marker. In a baccarat game, used are two types of markers, that is, a marker 43a indicating win of a player and a marker 43b indicating win of the banker. When a result of the game is decided, the dealer 5 faces down the marker of the winning side of the player and the banker. Therefore, the win or lose of the game can be easily found on the table. After the end of the collection of the chips 9 and the redemption, the faced-down maker is returned to the initial state by the dealer 5. If the maker is returned to the initial state, the state denotes that the next game can be started.

In this manner, in the embodiment, the control device 14 calculates balance in chips from the amount of the betting chips on the gaming table 4 for each game and the win or lose result of the game and verifies the increased amount of the balance of the chips in the chip tray 17 after the game. If the difference is detected in the verification, the control device 14 issues caution or adds the record indicating this message to the record of the video captured by the camera 2. A casino manager can investigate the cause of the difference by checking the video.

In the embodiment, the fraud detection system performs addition/subtraction calculation of the increased/decreased amount of the chips in the game calculated from the position, type, and number of the chips 9 wagered by all the players 6 in the game and the win or lose result of the game obtained from the win/lose result determining apparatus from the total amount of the chips 9 in the chip tray 17 before the settlement of each game and compares the correct total amount of the chips 9 in the chip tray 17 after the end of the game and the settlement and the actual total amount of the chips 9 in the chip tray 17 at the time of the end of the game obtained through the image analyzing apparatus 12 to determine whether or not there is difference between the correct total amount and the actual total amount.

The control device 14 recognizes the position, type, and number of the chips wagered by each player through the image analyzing apparatus 12, recognizes the actual total amount of the chips in the chip tray at the time when the collection of all the amount of the lost chips wagered by each player is ended, compares the correct total amount of the chips 9 in the chip tray 17 added with the increased amount of the chips in the chip tray 17 in the game from the position, type, and number of the chips wagered by the lost player from the total amount of the chips in the chip tray before the settlement of each game and the actual total amount of the chips 9 in the chip tray 17 to determine whether or not there is difference between the correct total amount and the actual total amount.

In the case where the control device 14 compares the correct total amount of the chips 9 in the chip tray 17 added with the increased amount of the chips in the chip tray 17 in the game from the position, type, and number of the chips 9 wagered by the lost player from the total amount of the chips 9 in the chip tray 17 before the settlement of each game and the actual total amount of the chips 9 in the chip tray 17 and determines that there is no difference between the correct total amount and the actual total amount and the control device compares the correct total amount of the chips in the chip tray 17 after the end of the game and the settlement and the actual total amount of the chips 9 in the chip tray 17 obtained through the image analyzing apparatus 12 at the time of the end of the game and determines that there is difference between the correct total amount and the actual total amount, the control device determines a mistake in payment and generates a payment mistake signal indicating the mistake in payment.

The chip tray 17 is provided with a collection chip tray 171 where the chips 9 wagered by the lost player are collected and temporarily stored. The image analyzing apparatus 12 compares the correct total amount of the chips 9 in the collection chip tray 171 added with the increased amount of the chips 9 in the game calculated from the position, type, and number of the chips 9L wagered by the lost player and the actual total amount of the chips 9 in the collection chip tray 171 to determine whether or not there is difference between the correct total amount and the actual total amount.

When the control device 14 determines that there is difference that the recognized actual total amount of the chips 9 in the chip tray 17 of the dealer 5 of the gaming table 4 does not match with the increased/decreased amount of the chips calculated from the amount of the chips wagered by all the players and the win or lose result of the game, the game recording apparatus 11 may allocate indexes or time points to the acquired images or may reproduce the images specified with a collection scene or a redemption scene of the chips 9 so that the record of the game where the difference occurs can be analyzed in the game recording apparatus 11.

In this manner, the control device 14 acquires the total amount of the chips in the chip tray 17 after the end of the game and the settlement through the image analyzing apparatus 12, and in this case, the determination after the settlement is performed at any one of the times 1) to 4) as follows: 1) The time when redemption for the winning chips 9 is ended; 2) The time when the cards C used in the game are collected to be discarded into a discard area 41 or a discard slot 42 of the table; 3) The time when a predetermined button attached to the win/lose result determining apparatus is pushed; and 4) The time when a marker 43 representing win or lose is returned to an initial state.

In addition, the control device 14 has an artificial intelligence utilizing type structure or a deep learning structure capable of extracting a strange situation (set by the casino side) by recognizing the position (position of player, banker, or pair wagered) and amount (type and number) of the chips wagered on each play position 7 of the gaming table 4, comparing the history of win and lose of each player 6 obtained from win or lose result of each game and the amount of the acquired chips (winning amount) and the statistical data of a large number of previous games (big data). Typically, the control device 14 has an artificial intelligence utilizing type structure or a deep learning structure, where, in the case where an winning amount of a certain amount (one million dollars) or more occurs and the state that the amount of betting chips at the lose time is small and the amount of betting chips at the win time is large at a play position 7 of a certain gaming table 4 continues several games, the state can be extracted as a strange situation by comparing the state and the statistical data (big data or the like) of previous games.

In addition, the control device 14 (integrated with the image analyzing apparatus 12) of the fraud detection system has a structure capable of extracting a strange situation or specifying individual player 6 at the play position 7 which the player wins a predetermined amount or more. With respect to the specifying of the player 6, in the image analyzing apparatus 12, an image of a face is obtained by extraction of feature points, and identification number (ID) is provided to specify the player. In addition, the control device 14 has a caution function of informing about the existence of the specified player in another gaming table when the specified player 6 departs and arrives at the other gaming table. More specifically, a pit manger managing each gaming table 4 or each table manager (or a dealer) is informed, so that the strange situation can be further prevented.

In addition, control device 14 is provided with database storing history of exchange of cash K and the chips 9. By referring to the database in unit of a predetermined time or a day, the control device performs comparison determination as to whether or not the recognized amount of the chips 9 in the chip tray 17 of the dealer 5 of the gaming table 4 is increased or decreased according to the paid amount of the chips 9 corresponding to the exchanged cash K or the total amount of the paid amount of the cash K corresponding to the exchanged chips 9.

In addition, in the above-described example, the history of win and lose and the amount of the acquired chips (winning amount) for each play position 7 may be surveilled without specifying individual player 6. In this case, if each player 6 leaves the seat, the player 6 cannot be tracked. However, the strange situation where the amount of betting chips at the lose time at the specified play position 7 of one game table 4 is small and the state that the amount of betting chips at the win time is large continues for several games can be detected. Next, in the case where such a play position 7 is detected, it is suspected that there is fraud or error at the play position 7. Next, by verifying the video obtained by capturing an image of the play position 7, the fraud or error can be found.

More specifically, the camera 2 is installed to capture at least an image of the chips 9 placed on the betting area 8 of the gaming table 4. The image analyzing apparatus 12 analyzes the image captured by the camera 2 to detect which of the positions "player", "banker", and "tie" of the betting area 8 the chips are placed on for each user position 7 and the amount of the placed chips. In addition, the card distribution device 3 also functions as a win/lose result determining apparatus to determine the win or lose result of the game. The control device 14 records (surveils) the history of win and lose and the amount of the acquired chips (acquired amount of chips) for each play position 7 based on the position (player, banker, or tie) of the betting area 8 on which the chips 9 are placed and the win or lose result of the game. In addition, any one of the history of win and lose and the acquired amount of chips may be recorded. In the case of a strange situation (set by the casino side) that the history of win and lose and/or the history of the acquired amount of chips are strange in comparison with the statistical data of a large number of previous games (big data), the control device 14 specifies the player position 7 as a play position where fraud is suspected to occur.

In the case where fraud is suspected to occur at a certain player position 7, the fraud detection system may generate alarm (light, sound, or vibration) so that at least dealer can perceive at this time. Therefore, at least at this moment, by stopping the subsequent game or the like, it is possible to prevent the fraud from continuously occurring. In addition, information indicating that fraud is suspected to occur may be added to the image captured and recorded by the camera 2. Therefore, by checking video, it is possible to find a cause of the suspicion of the fraud.

The fraud detection system in the casino having the gaming table according to the embodiment further has a function of performing inspection at the time of exchange of cash and chips which is frequently performed in the gaming table 4. In the casino such as a casino, before a game, the player 6 exchanges money (cash or the like) and gaming chips at a predetermined cashier cage. When the player 6 spends all chips, the player may exchange cash and chips 9 on the gaming table (baccarat table or the like) to continuously do the game without leaving the seat from the gaming table 4. However, at the point, there is a chance of fraud between the dealer 5 and the player. On the gaming table (baccarat table or the like), the exchange of the cash and the chip 9 needs to be performed when the game is not in progress. In order to determine the win or lose of the game, the card distribution device 3 can detect card dealing start and dealing end (time of determining the win or lose). Therefore, the card distribution device 3 detects a situation other than card distributing (dealing), and the control device 14 detects the exchange of the cash and the chips 9 in the gaming table 4 in the situation other than the card dealing (illustrated in FIG. 6). The card dealing (or the situation other than the card dealing) can be detected by the card distribution device 3 or based on the information obtained from the behavior of the dealer 5.

Figure 6:
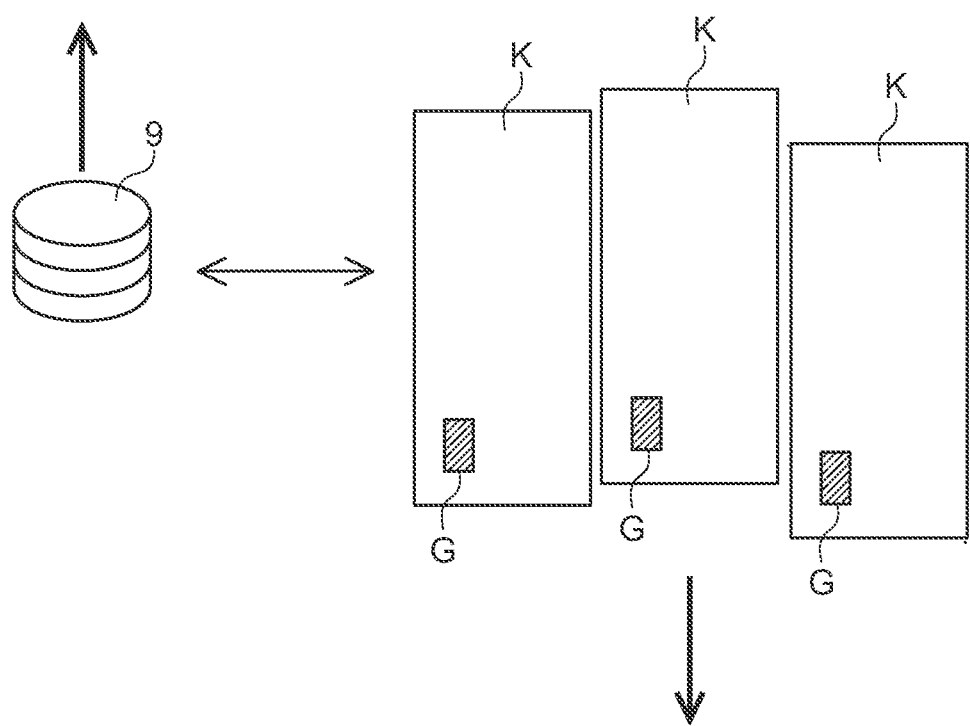
FIG. 6 is a diagram illustrating a simplified image of a state of exchange of cash and chips recognized in the first embodiment of the invention.

The control device 14 can recognize the number and amount of cash K by performing the image analysis on the surface of the cash. In addition, in the gaming table 4, whether or not the cash K in exchange for the chips 9 is genuine is performed by irradiating the cash with black light to detect a genuine mark G of the cash. As illustrated in FIG. 6, the control device 14 has an artificial intelligence utilizing type structure or a deep learning structure capable of verifying the genuine mark G through the image analysis, recognizing the total amount of the genuine cash, recognizing the total amount of the chips even in the state that a plurality of chips as an exchange object placed on the gaming table are concealed due to a blind spot of the camera 2, and comparing the total amount of the cash K placed on the gaming table 4 by the player and the total amount of the chips 9 placed by the dealer 5 to determine whether or not the two amounts match with each other.

The control device 14 has an artificial intelligence utilizing type structure or a deep learning structure capable of performing comparison calculation as to whether or not the total amount of the chips 9 in the chip tray 17 of the dealer 5 of the gaming table 4 is increased or decreased according to the paid amount of the chips corresponding to the exchanged cash after the exchange of cash and chips and the settlement. The case where the total amount of the chips 9 in the chip tray 17 of the dealer 5 is always checked by the RFID or the like of the chips 9 in advance may be considered. In addition, the total amount of the chips 9 contained in the chip tray 17 can be detected by capturing an image of the chip tray 17 containing the chips 9 by using the camera 2 and analyzing the image by using the image analyzing apparatus 12.

In addition, the control device 14 verifies match between the increase or decrease of the amount of the chips 9 in the chip tray 17 and the exchanged amount of the chips according to the result of the image analysis of the gaming table 4 before and after the exchange of cash and chips. The paid amount of the cash may be input to the control device 14 by the dealer 5 through key input or the like. The paid amount of the cash may be specified by the camera 2 capturing an image of the gaming table 4 where the cash is being paid and by the image analyzing apparatus 12 analyzing the image.

As described above, the control device 14 determines whether or not the decreased amount of the chips 9 in the chip tray 17 due to the exchange of cash and chips matches with the amount of the cash paid to the dealer 5 by the player 6. In addition, the control device 14 is an intelligence control device and has an artificial intelligence utilizing type structure or a deep learning structure capable of performing comparison calculation of match or mismatch between the input amount (typically, obtained by key input or the like) of the cash by the dealer 5 and the calculated amount of the cash obtained from the result of the image analysis by the image analyzing apparatus 12 after the exchange of cash and chips and the settlement.

In addition, the control device 14 has an artificial intelligence utilizing type structure or a deep learning structure capable of performing comparison calculation of match or mismatch between the total input amount of the cash according to the input by the dealer in the gaming table 4 for which the dealer is responsible and the total amount of the cash according to the result of the image analysis by the image analyzing apparatus 12.

The control device 14 performs comparison determination as to whether or not the recognized amount of the chips 9 in the chip tray 17 of the dealer 5 of the gaming table 4 is increased or decreased according to the paid amount of the chips 9 corresponding to the exchanged cash or the paid amount of the cash corresponding to the exchanged chips 9 after the exchange of the cash and the chips 9.

Among many table games played in a casino such as a casino, there are baccarat and blackjack. In such a game, a standard deck of 52 playing cards is used, the playing cards are distributed on the game table from a card distribution device including a plurality of decks (six to nine decks or ten decks) which are shuffled in advance, and win or lose is determined according to the number of distributed cards and a game rule.

The distribution of the cards from the card distribution device and the settlement of betting money to a player (game participant) are performed by a dealer or the like who is responsible for the gaming table. In a casino such as a casino, prevention of error or fraud in the settlement of the betting money for the player (game participant) is attempted.

WO 2015/107902 discloses a card game monitoring system of reading movement of chips by using a surveillance camera and checking whether or not betting money is paid to a winner.

In a baccarat or a blackjack, there are problems in that, in the betting by a player or in the settlement for betting money to the player (game participant) by the dealer, timing of performing the betting and the settlement, who places the chips, or who takes the chips cannot be detected, and thus, whether or not these are correct cannot be recognized.

In order to solve the above-described problems, according to the second embodiment, a fraud detection system in a casino including a gaming table includes: a game monitoring device which monitors a progress of a game played on the gaming table by using a camera, an image analyzing apparatus which performs image analysis on an image obtained from the camera, a card distribution device which determines a win or lose result of each game in the game table, and a control device which specifies positions of chips placed on the gaming table by game participants by using a result of the analysis of the image analyzing apparatus in each game and determines a winner and losers among the participants of each game by using the win or lose result, and the control device further includes a function of determining at least one of: 1) whether or not there is movement of chips during the time interval from the start of extraction of cards or from the game start operation of the dealer before the win or lose result of the game is displayed by the card distribution device in each game; 2) whether or not there is movement of chips by a person other than the dealer during the time interval when the dealer collects chips wagered by the losers among the game participants after the end of each game; 3) whether or not a chip is added during the time interval when the dealer collects chips wagered by the losers among the game participants after the end of each game; 4) whether or not the dealer performs payment for a position of chips wagered by the winner among the game participants after the end of each game; and 5) whether or not the winner among the game participants receives wagered chips and paid chips after the end of each game.

In addition, the control device may be configured so as to determine at least one of the aforementioned 1) to 5) by detecting movement of hands of the dealer and the game participants, movement of the chips, or the movement of hands and the movement of chips by using the result of the analysis of the image analyzing apparatus.

In addition, the control device may be configured so as to determine whether or not the amount of chips paid to the winner by the dealer is correct in accordance with the amount wagered by the winner among the game participants.

In addition, the fraud detection system of the game may be further provided with a monitor or lamp which receives the determination result and performs caution or display.

According to the fraud detection system of the embodiment, in a baccarat or a blackjack, in the betting by the player or in the settlement for betting money to the player (game participant) by the dealer, timing of performing the betting and the settlement, who places the chips, or who takes the chips can be detected, so that such an error or fraud is detected, a caution of the error or fraud is issued or the error or fraud is displayed, and the recurrence there can be prevented.

Before the embodiment is described in detail, a flow of a baccarat game played in a casino such as a casino will be described. In addition, in the second embodiment, the same components as those of the first embodiment are denoted by the same reference numerals.

Figure 7:
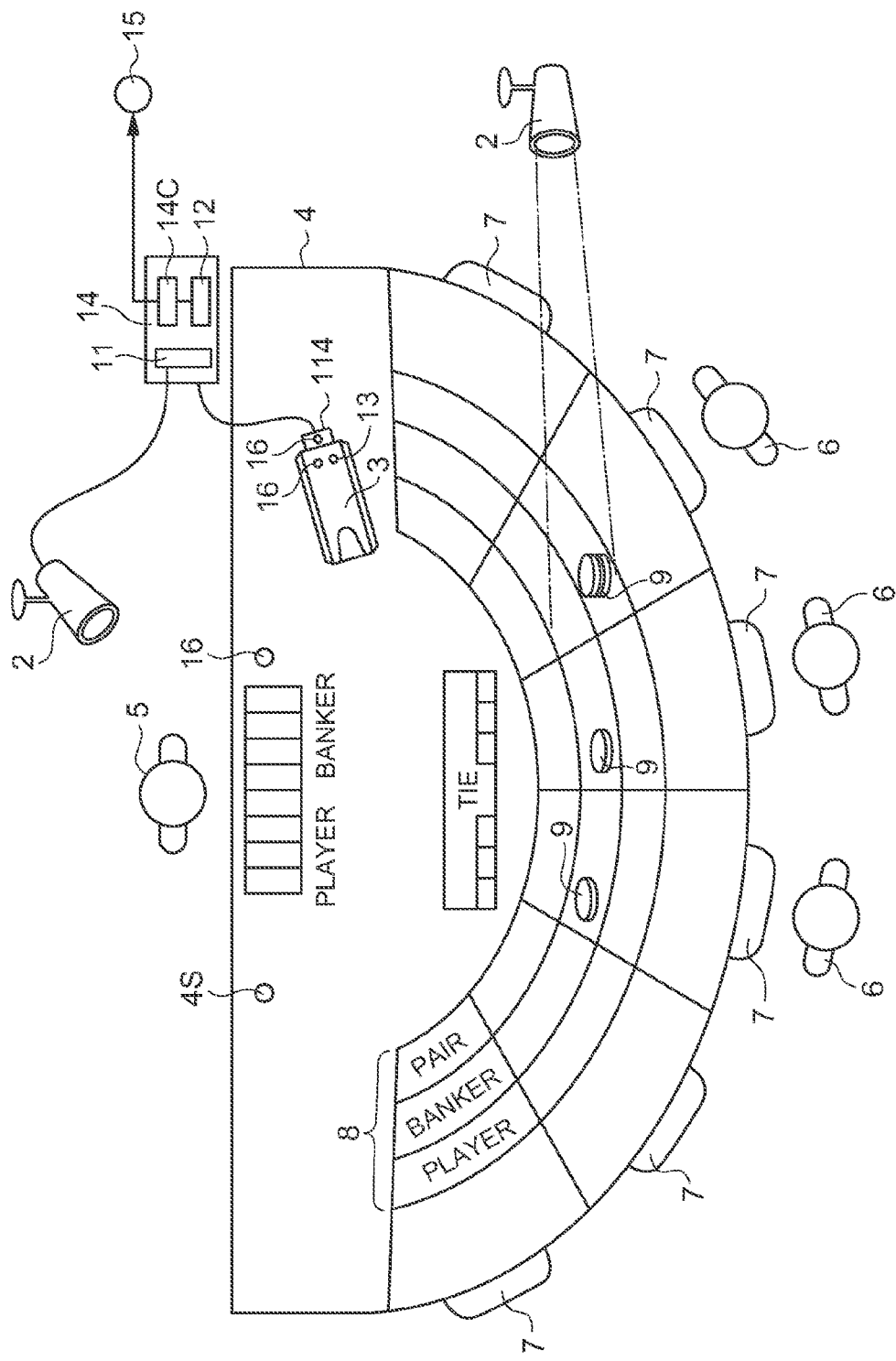
FIG. 7 is a plan diagram illustrating an overview of a fraud detection system in a baccarat game according to a second embodiment of the invention.

As described in FIG. 7, in the gaming table 4, the players (game participants) 6 take seats at the play positions 7 to face the dealer 5. The player (game participant) 6 performs wagering (hereinafter, referred to "betting") as to who of the player and the banker wins or whether the player and the banker ties as a win or lose result of the baccarat game by placing the chips 9 on the betting area 8 in front of the player's eyes. The dealer 5 counts time in order to end the betting by the players (game participants) 6 and calls "No More Bet (end of receiving the betting)" while moving the hand in the transverse direction (the state illustrated in FIG.

7). In the baccarat game, during the time interval from the time when the "No More Bet (end of receiving the betting)" is called and card extraction is started or the dealer 5 performs the game start operation before the win or lose result of the game is displayed by the card distribution device 3, the players (game participants) 6 are cannot operate chips, wager additional chips, or recover the chips which have been wagered once.

After that, the playing cards 1 are extracted one by one from the card distribution device 3 on the gaming table 4 in the state that the back side is faced up. First, four cards are extracted, as illustrated in (1) to (4) of FIG. 7, the first card goes to the hand of "player", the second card goes to the hand of "banker", the third card goes to the hand of "player", and the fourth card goes to the hand of "banker". These cards are arranged to be distributed to areas 10 (player area 10P and banker area 10B) on the gaming table 4 in the front side as viewed from the dealer 5. Next, according to the ranks (numbers) of the first to fourth cards 1 and the condition in the detailed rule of the baccarat game, the fifth card 1 and the sixth card 1 are extracted by the dealer 5, and these cards go to the hand of "player" or "banker". Next, according to the ranks (numbers) of the first to fourth cards 1 (in some case, the fifth and sixth cards are combined) and the detailed rule of the baccarat game, the win or lose of the game is determined. Herein, a game rule is programmed in the card distribution device 3, and the card distribution device has a structure where the win or lose of the game can be determined by reading information (ranks (numbers) or suits) of the cards 1 distributed. It is determined whether or not the win/lose determination result (win or lose result) determined by the card distribution device 3 matches with the win or lose result determined by the dealer or the like as described above.

Hereinafter, an overview of the fraud detection system for the game in the embodiment of the invention will be described. FIG. 7 is a diagram illustrating the overview of the system. The fraud detection system for the game in the casino is configured to include a game recording apparatus 11 which records a progress of the game played in the gaming table 4 including a player (game participant) 6 and the dealer 5 as an image through cameras 2, an image analyzing apparatus 12 which performs image analysis on the recorded image of the progress of the game, and a card distribution device 3 which has a function of determining a win or lose result of each game in the gaming table 4 and displaying the win or lose result. The card distribution device 3 is a so-called electronic shoe used by the skilled in the art and has a structure where a game rule is programmed in advance, the timing that the cards 1 are distributed by the dealer 5 at the initial time of each game is sensed, and the win or lose of the game can be determined by reading information (rank (number) or suit) of each card 1 distributed. For example, in a baccarat game, banker win, player win, or tie is basically determined by a rank of two or three cards, and a determination result (win or lose result) is displayed by a display lamp 13.

The control device 14 of the fraud detection system has a chip detecting function of specifying which of the betting areas 8 of the player side and the banker side on the gaming table 4 the players 6 (game participants) wager the chips 9 on by using the result of the analysis of the image analyzing apparatus 12 in each game. It is assumed that, when the chips 9 are overlapped in a deviated manner or are in a blind spot from the position of the camera 2, the position and total amount of the chips 9 (which of the betting areas 8 of the player side and the banker side the chips 9 are wagered on) cannot be read normally. The control device 14 is configured to be capable of recognizing concealing or the like (including concealing of a portion of one chip and concealing of the entire chip) of the chip 9 caused by the blind spot, so that the number of chips or the like can be accurately recognized by using a self-learning function or the like according to an existing artificial intelligence utilizing type computer or control system and deep learning (structure) technique. In addition, the structure of detecting the position and type of the chip 9 in the betting area 8 is not limited thereto, but for example, the structure may be configured so that the position and the type can be detected by reading the ID buried in the chip.

As described heretofore, the control device 14 can recognize, through the camera 2 and the image analyzing apparatus 12, the position (position of player, banker, or pair wagered) on which each player 6 wagers the chips 9 and the type (different amount values are designated to different colors of the chips 9) and number of the chips 9, and the control device can detect who is the player 6 betting on the "player" (in the case where there are a plurality of the players 6 betting on the "player", who is the player 6 wagering the highest amount) and who is the player 6 betting on the "banker" (in the case where there are a plurality of the players 6 betting on the "banker", who is the player 6 wagering the highest amount). In this fraud detection system, each of the image analyzing apparatus 12 and the control device 14 has a structure including a computer configured with an integrated or plural components, a program, and a memory in a complex manner.

The control device 14 has a structure capable of determining match or mismatch by checking information on rank and suit obtained from the image (captured by using the camera 2) of each card 1 distributed in the gaming table 4 by the image analyzing apparatus 12 and information on rank and suit read by the card distribution device 3. The control device 14 determines by image analysis of a progress of the game through the image analyzing apparatus 12 according to the win or lose result of the game determined by the card distribution device 3 for each game whether or not the collection of the lost chips 9 wagered by the players (game participants) 6 and the redemption of the winning chips to the winning player (game participant) 6 are correctly performed in accordance with the win or lose result.

Figure 8:
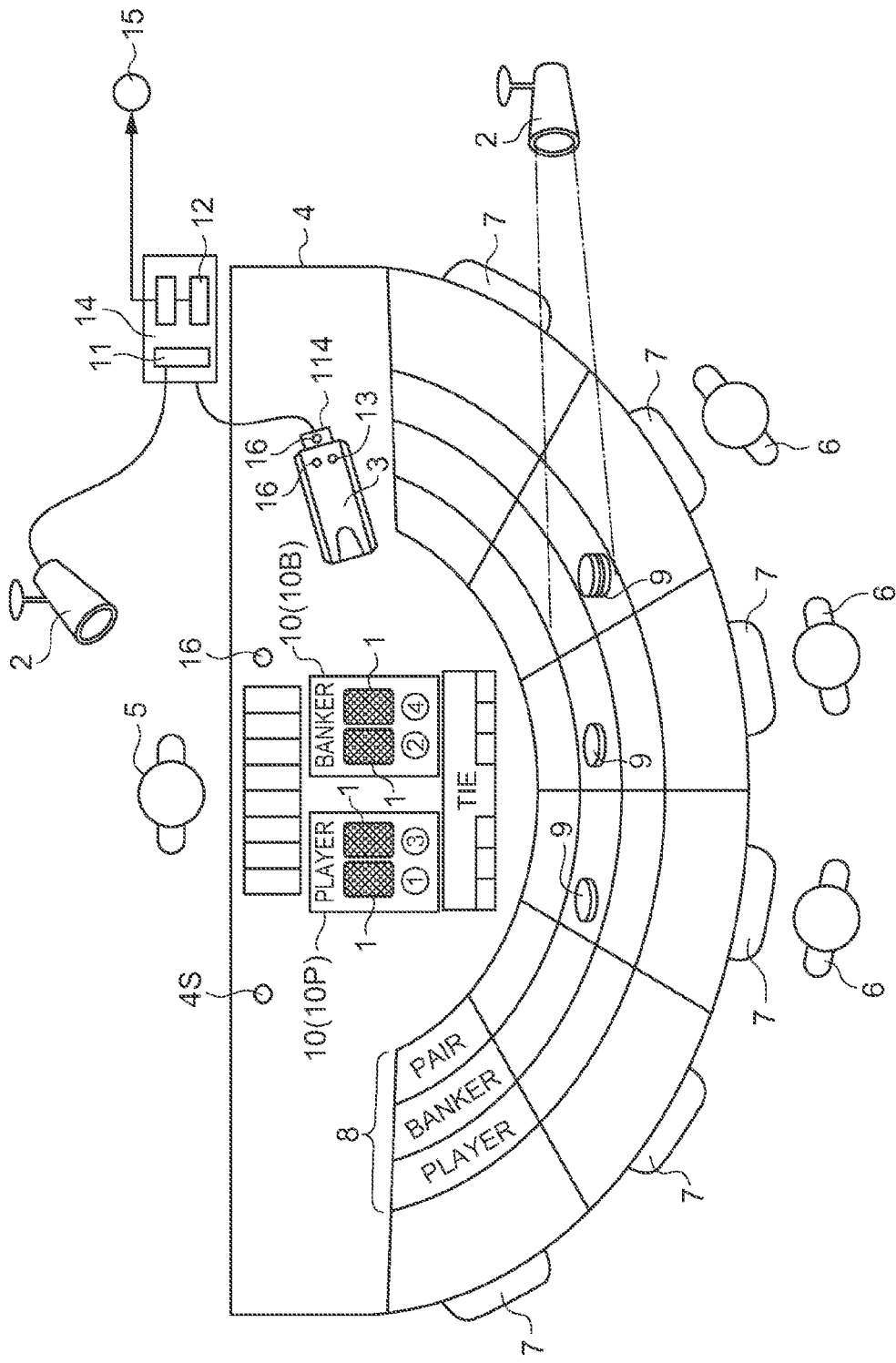
FIG. 8 is a plan diagram illustrating an overview of a progress of a baccarat game in the fraud detection system according to the second embodiment of the invention.
Figure 9:
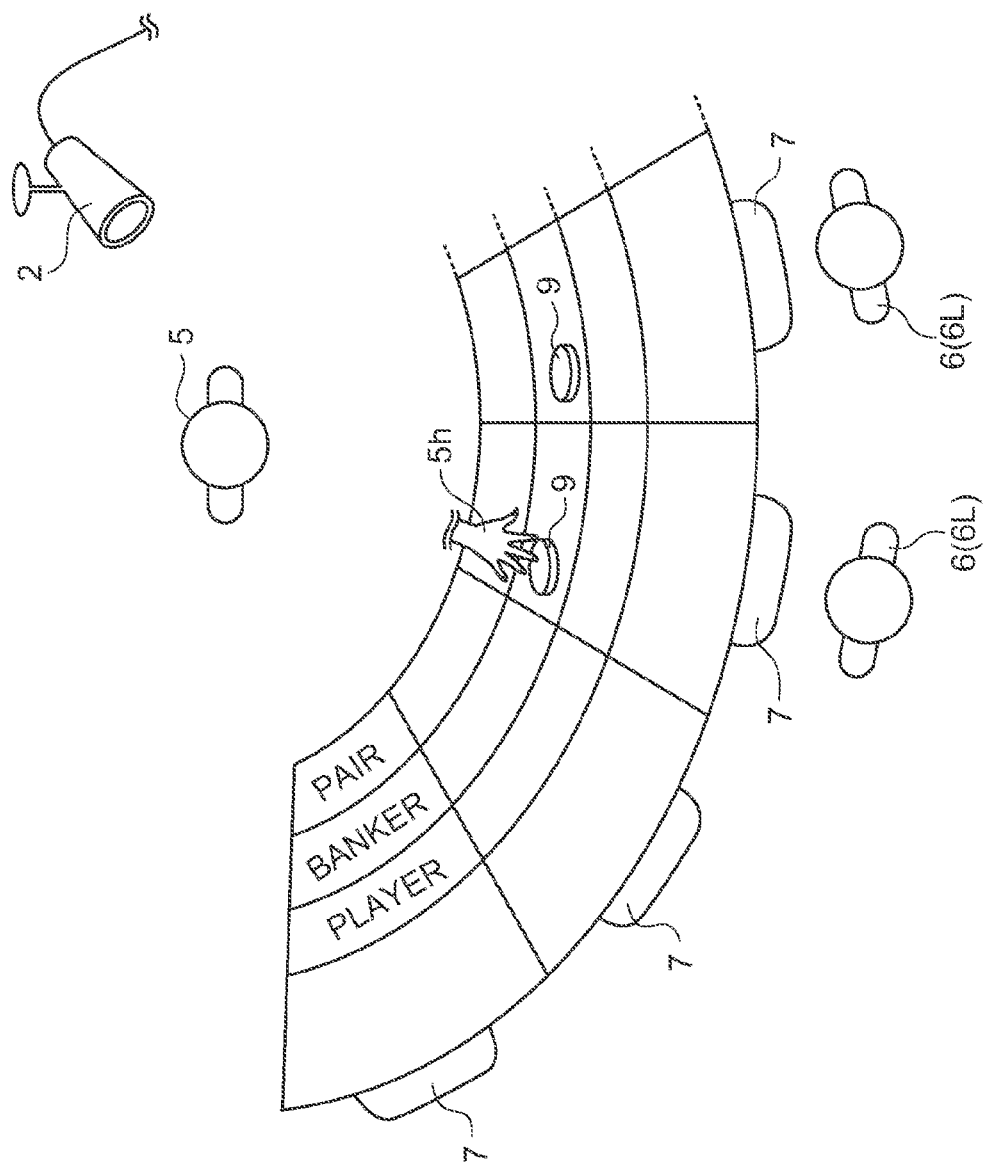
FIG. 9 is a diagram illustrating a situation that a dealer in a baccarat game collects chips which a casino side wins.
Figure 10:
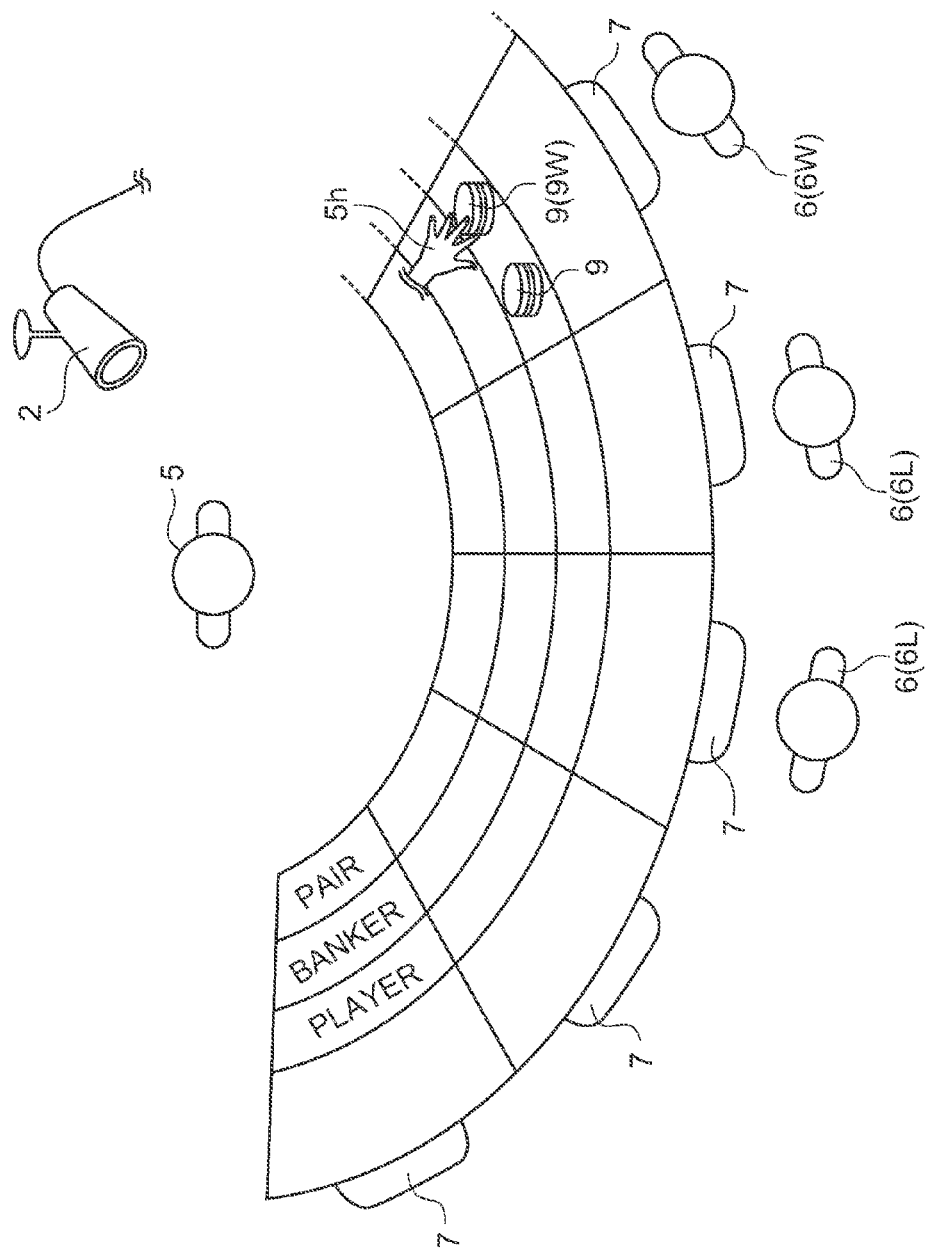
FIG. 10 is a diagram illustrating a situation in the second embodiment of the invention that a dealer in a baccarat game pays for a wining player (game participant)

As remarkable functions of the invention, the control device 14 has functions described in the following 1) to 5) according to the rule of the baccarat game and determines whether or not fraud in discordance with the rule is performed. Namely, the functions are as follows: 1) Whether or not there is movement of the chips 9 is surveilled by the information obtained the image analyzing apparatus 12 using the camera 2 during the time interval from the signal starting the card extraction obtained from the card distribution device 3 or from the game start operation of the dealer 5 pushing a start button 4s before the win or lose result of the game is displayed by the card distribution device 3 in each game (illustrated in FIG. 8); 2) Whether or not the loser 6 takes the chips 9 fraudulently is surveilled by the information obtained the image analyzing apparatus 12 using the camera 2 during the time interval when the dealer 5 collects the chips 9 wagered by the loser among the game participants 6 after the end of each game (illustrated in FIG. 9); 3) Whether or not a person (winner or loser) other than the dealer 5 adds the winning chips 9W or newly places the chips 9 on the winning side which the person did not wager chips on is surveilled by the information obtained the image analyzing apparatus 12 using the camera 2 during the time interval when the dealer 5 collects the chips 9 wagered by the loser among the game participants 6 after the end of each game; 4) Whether or not the dealer 5 correctly places the paid chips 9W on the position of the chips 9 wagered by the winner among the game participants 6 (illustrated in FIG. 10) is surveilled by the information obtained the image analyzing apparatus 12 using the camera 2 after the end of each game; 5) Whether or not the winner 6W among the game participants 6 takes the wagered chips 9 and the paid chips 9W (illustrated in FIG. 11) is surveilled by the information obtained the image analyzing apparatus 12 using the camera 2 after the end of each game (the dealer 5 manipulates the card distribution device 3 to allow the display lamp 13 to display the win or lose result).

The control device 14 performs analysis of the information obtained by using the camera 2 by the image analyzing apparatus 12. Namely, although the above-described surveillance of from 1) to 5) is performed by detecting the movement of the hands of the dealer 5 and the game participant 6, the movement of the chips, or the movement of the hands and the movement of the chips by the using the analysis result of the image analyzing apparatus 12, in a fundamental analysis, it needs to be found at least who the chips 9 is taken to. Hereinafter, a method of the analysis will be described with reference to FIGS. 12A to 12C and 13.

The chips 9 wagered by the game participant 6L losing the game are collected by the dealer 5. Whether or not the collection is accurately performed is surveilled by analyzing the information obtained by using the camera 2 in the image analyzing apparatus 12. First, a change from the state (FIG. 12A) that the betting chips 9 exist to the state (FIG. 12C) that the chips do not exist is detected by the image analysis. Next, an image (FIG. 12B) between the state that the chips 9 exist and the state that the chips do not exist is analyzed. In the image (FIG. 12B) between the state that the chips 9 exist and the state that the chips do not exist, which side the hand 5*h* reaches from (from the top side of FIG. 12 or the others) is analyzed. Fraud is detected in accordance with a rule, that is, in the case where the hand reaches from the top side (the hand movement, that is, the hand appears from the top side or the hand leaves toward the top side), the hand 5*h* is determined as the hand of the dealer 5, and in the case where the hand reaches from the other directions, the hand movement is determined as fraud.

Figure 11:
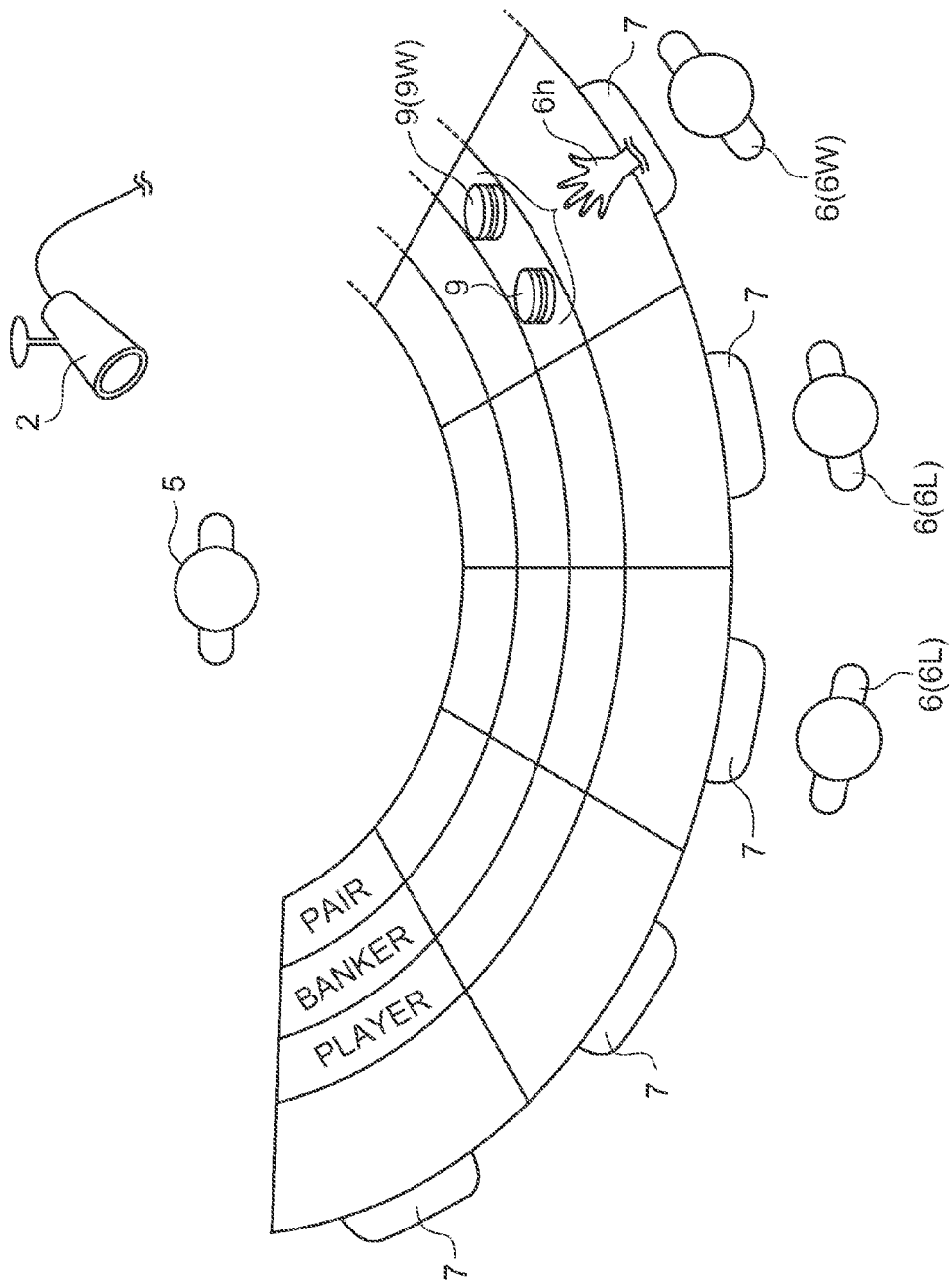
FIG. 11 is a diagram illustrating a situation in the second embodiment of the invention that a wining player (game participant) in a baccarat game collects chips and receives payout.
Figure 12A:
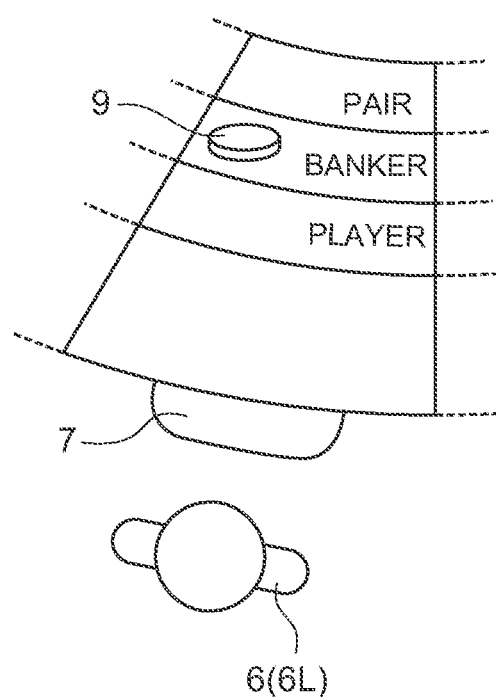
FIG. 12A is a diagram illustrating an image as an object of image analysis for collection of chips which a casino side wins by a dealer in the fraud detection system according to the second embodiment of the invention.
Figure 12B:
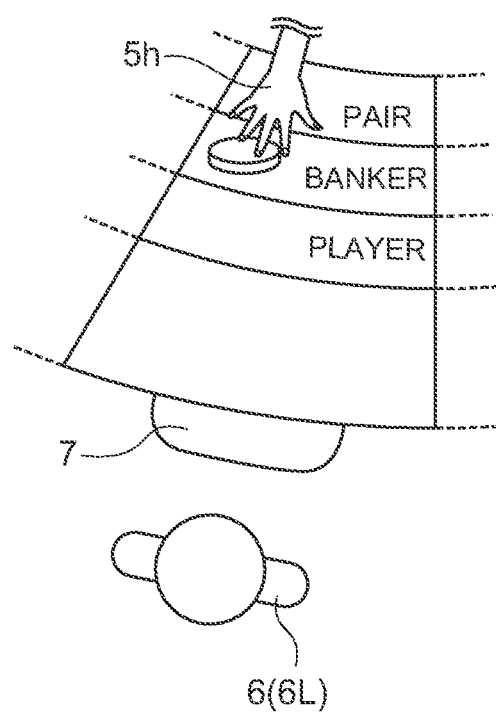
FIG. 12B is a diagram illustrating an image as an object of image analysis for collection of chips which a casino side wins by a dealer in the fraud detection system according to the second embodiment of the invention.
Figure 12C:
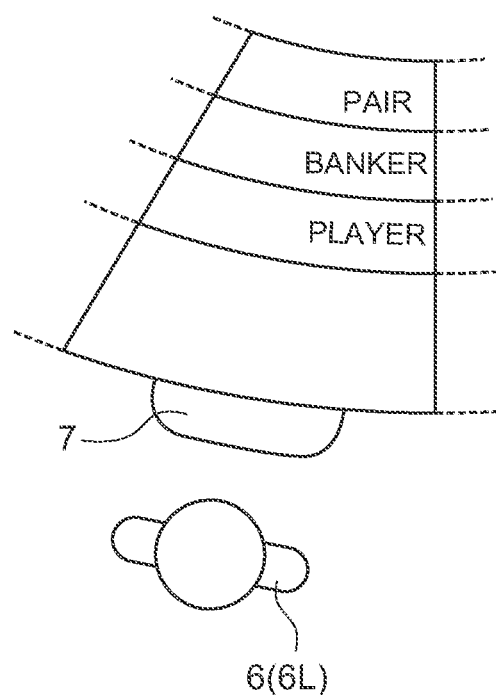
FIG. 12C is a diagram illustrating an image as an object of image analysis for collection of chips which a casino side wins by a dealer in the fraud detection system according to the second embodiment of the invention.
Figure 13:
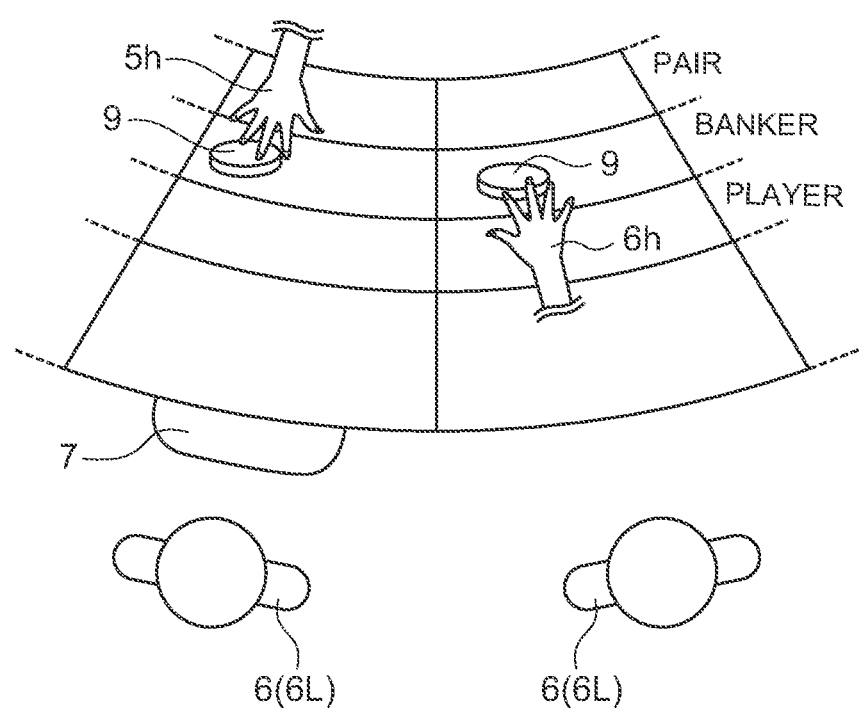
FIG. 13 is a diagram illustrating an image as an object of image analysis for fraudulent collection of chips in the fraud detection system according to the second embodiment of the invention.

While the dealer 5 collects the chips 9 wagered by the game participant 6L losing the game, it is surveilled whether or not another person takes the lost chips 9 fraudulently (FIGS. 12 and 11). In the image between the state that the chips 9 exist and the state that the chips do not exist, as illustrated in FIG. 12, through analyzing the movement of the loser 6L and the like among the game participants 6, it is detected by the image analysis that the hand 6*h* reaches or moves from the bottom side of FIG. 12 (actually, from the top side), and the movement is determined that the hand 6*h* or the like other than the hand of the dealer 5 takes the chips 9, so that it is determined that fraud occurs.

Figure 14A:
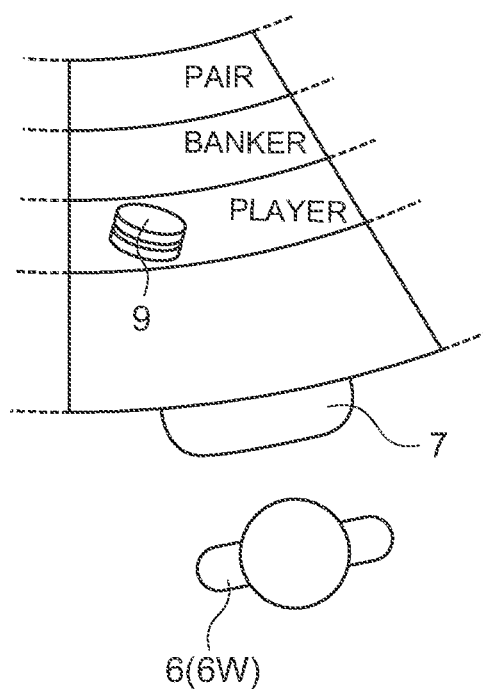
FIG. 14A is a diagram illustrating an image as an object of image analysis for collection of chips which a game participant side wins in the fraud detection system according to the second embodiment of the invention.
Figure 14B:
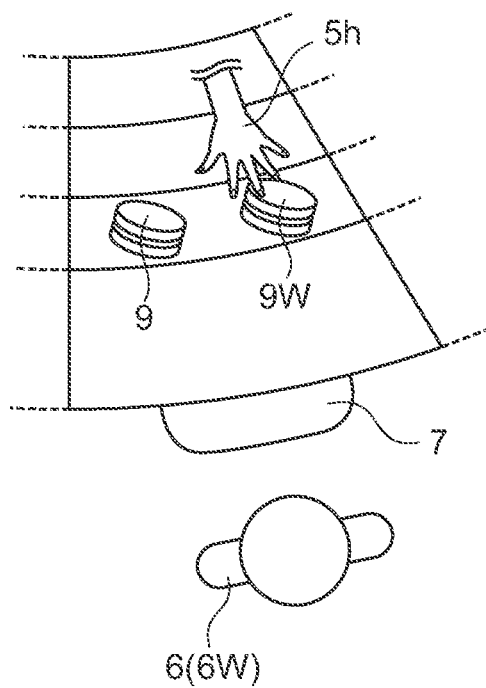
FIG. 14B is a diagram illustrating an image as an object of image analysis for collection of chips which a game participant side wins in the fraud detection system according to the second embodiment of the invention.
Figure 14C:
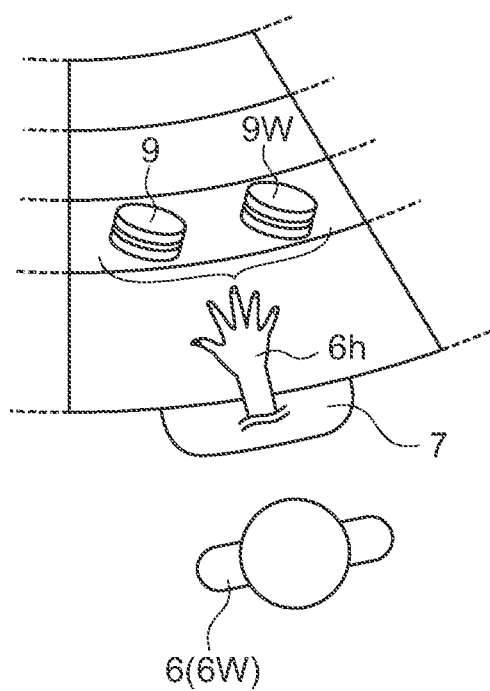
FIG. 14C is a diagram illustrating an image as an object of image analysis for collection of chips which a game participant side wins in the fraud detection system according to the second embodiment of the invention.
Figure 14D:
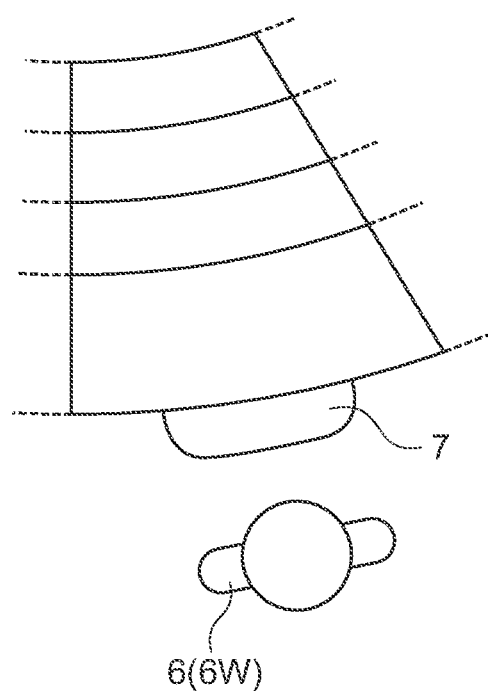
FIG. 14D is a diagram illustrating an image as an object of image analysis for collection of chips which a game participant side wins in the fraud detection system according to the second embodiment of the invention.
Figure 15:
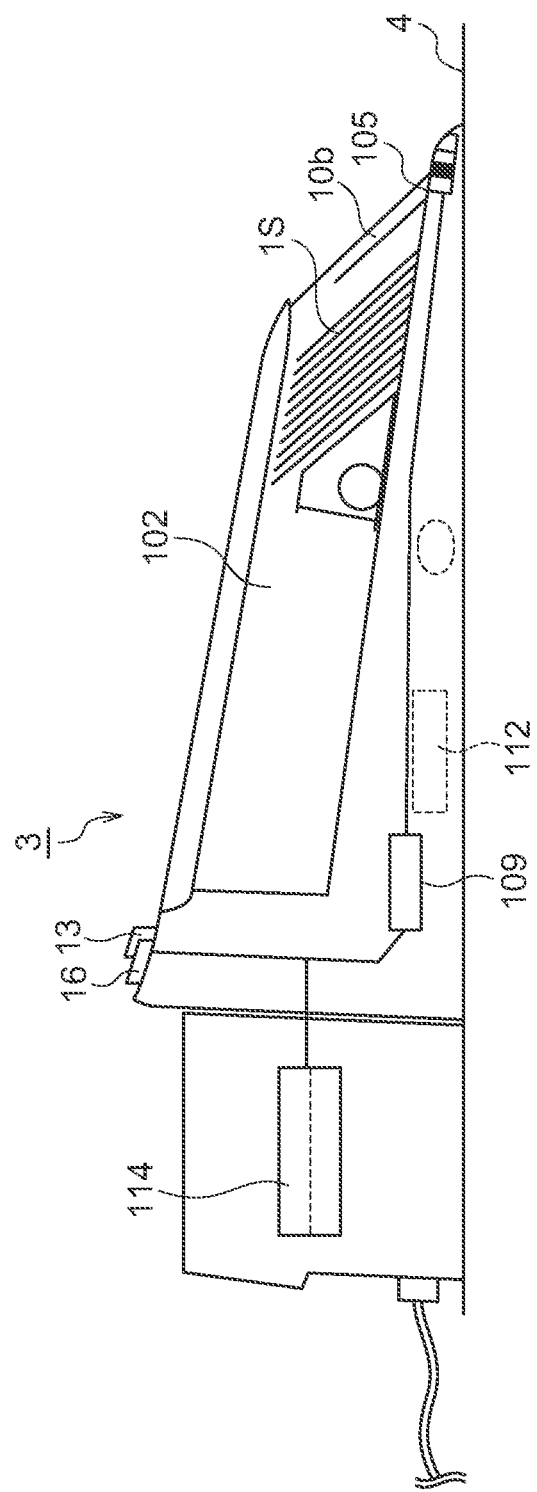
FIG. 15 is a side cross-sectional diagram illustrating a card distribution device in the second embodiment of the invention.

First, with respect to the winning chips illustrated in FIG. 14A, the chips 9W are redeemed in accordance with the game rule as illustrated in FIG. 14B. A change from the state illustrated in FIG. 14A to the state illustrated in FIG. 14B is detected, and at the same time, whether or not the hand is the hand 5*h* of the dealer 5 is detected by the image analysis. After that, as illustrated in FIG. 14C, now, whether or not the hand 6*h* of the winner 6W among the game participants 6 reaches (moves) the same betting area and, after that, all the chips 9 do not exist (state of FIG. 14D) is verified from the image analysis result in accordance with the game rule by the control device 14, so that it is determined whether or not fraud occurs.

In addition, the control device 14 is configured to determine whether or not the amount of chips redeemed to the winner by the dealer 5 is correct according to the amount wagered by the winner 6W among the game participants 6. Hereinafter, a specific example thereof is described. It is assumed that, when the chips 9 are overlapped in a deviated manner or are in a blind spot from the position of the camera 2, the position and total amount of the chips 9 (which of the betting areas 8 of the player side and the banker side the chips 9 are wagered on) cannot be read normally. The control device 14 is configured to be capable of recognizing concealing or the like (including concealing of a portion of one chip and concealing of the entire chip) of the chip 9 caused by the blind spot, so that the number of chips or the like can be accurately recognized by using a self-learning function or the like according to an existing artificial intelligence utilizing type computer or control system and deep learning (structure) technique. In addition, the structure of detecting the position and type of the chip 9 in the betting area 8 is not limited thereto, but for example, the structure may be configured so that the position and the type can be detected by reading the ID buried in the chip.

As described heretofore, the control device 14 can recognize, through the camera 2 and the image analyzing apparatus 12, the position 8 (position of player, banker, or pair wagered) on which each player 6 wagers the chips 9 and the type (different amount values are designated to different colors of the chips 9) and the number of the chips, and the control device can detect who is the player 6 betting on the "player" (in the case where there are a plurality of the players 6 betting on the "player", who is the player 6 wagering the highest amount) and who is the player 6 betting on the "banker" (in the case where there are a plurality of the players 6 betting on the "banker", who is the player 6 wagering the highest amount).

In addition, the control device 14 of the fraud detection system in the game analyze the information obtained by the image analyzing apparatus 12 using the camera 2 by the above-described method in accordance with the rule of the baccarat game and performs surveillance. By performing the surveillance illustrated in the above-described 1) to 5), it is determined whether or not fraud in discordance with the rule is performed. When fraud is detected, a card distribution sensing device 14C turns on abnormality display lamps 16 provided to both of the card distribution device 3 and the gaming table 4 and outputs 15 the fraud detection to a casino management department or the like in a wireless or wired manner. A monitor or a lamp which receives the determination result to perform caution or display may be further provided to another site.

As described heretofore, the fraud is detected by the control device 14, and, at the detecting time or a proper timing, a display signal is output to the display lamp 13 of the card distribution device 3 or the abnormality display lamp 16. However, besides the performing of caution, after the time when the fraud or error is detected, a card distribution preventing function of the card distribution device 3 may be performed to prevent the distribution of the cards 1.

Hereinafter, an embodiment of the card distribution device 3 used in a table game system according to the invention will be described with reference to FIGS. 15 to 19. The card distribution device 3 is configured to include a card containing portion 102 which contains a plurality of shuffle playing cards 1*s*, a card guiding portion 105 which guides the shuffle playing card 1 when the dealer 5 or the like manually extracts the shuffle playing card 1 one by one from the card containing portion 102 toward the gaming table 4, an opening portion 106 for taking the card 1 guided from the card guiding portion 105, a card detecting unit (card detecting sensors 22 and 23) which detects that the shuffle playing card 1 is extracted when the shuffle playing card 1 is extracted, a card reading unit 108 which reads information representing at least the number (rank) of the shuffle playing card 1, a control unit 109 which determines the win or lose of the card game based on the numbers (ranks) of the shuffle playing cards 1 sequentially read by the card reading unit 108, a result display lamp 13 which displays the win or lose result determined by the control unit 109, a distribution restricting device 30 which is provided to the opening portion 106 and restricts entering and exiting of the card 1 from the card containing portion 102, and a management control unit 114 having functions equivalent to the control device 14, and these components are integrated. The card distribution device has a function where, in the case where error or fraud of the dealer in the game is detected by the control device 14, the further extraction of the card from the card distribution device 3 is stopped after the time of the detection or at a predetermined timing.

Figure 16:
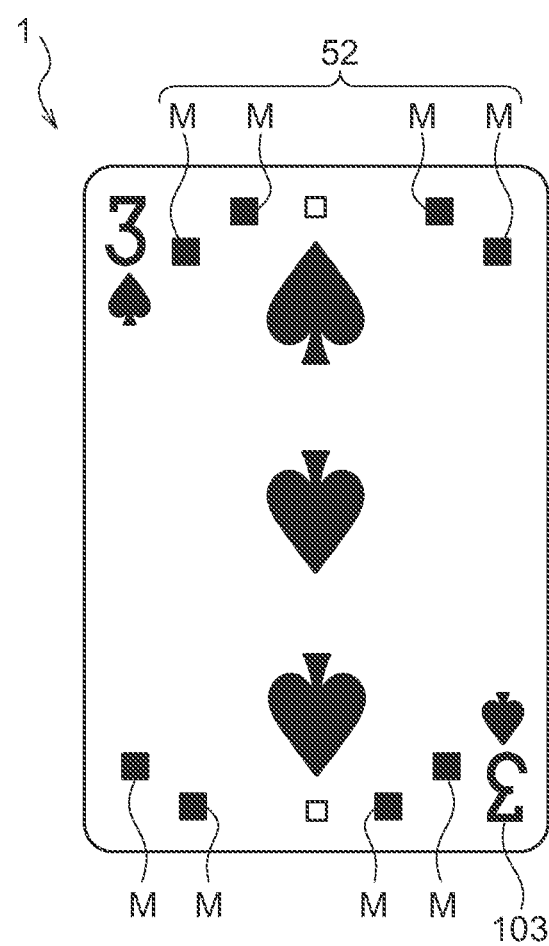
FIG. 16 is a diagram illustrating an example of a card in the second embodiment of the invention.
Figure 17:
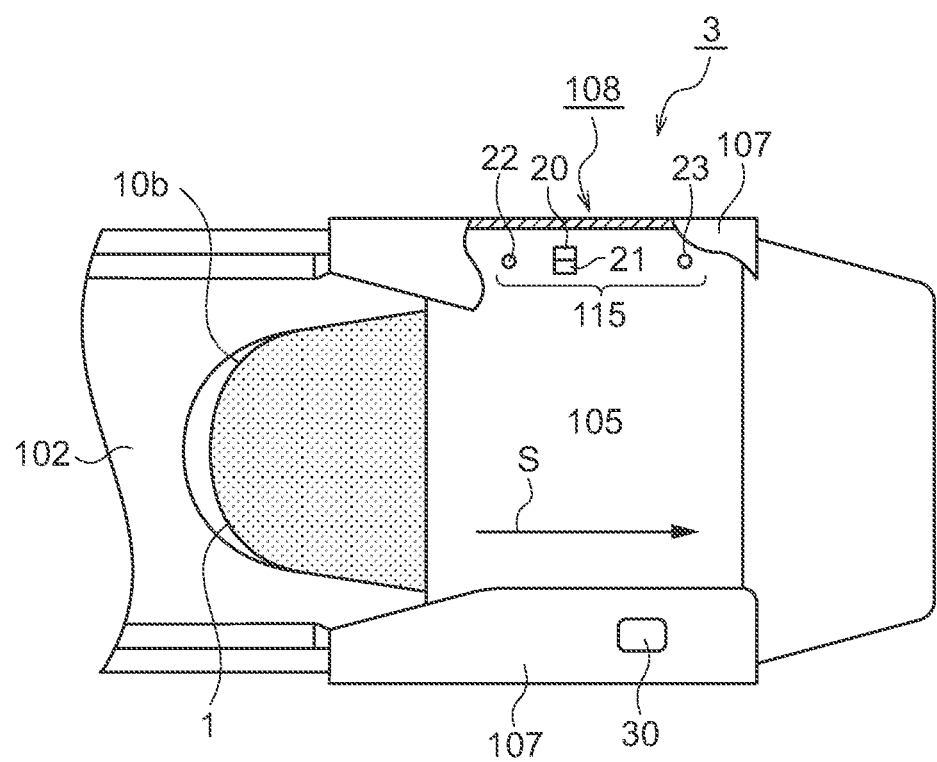
FIG. 17 is a partial cutaway plan diagram illustrating main components of a card guiding portion of the card distribution device in the second embodiment of the invention.

Next, the distribution restricting device 30 which restricts the entering and exiting of the cards 1 from the card containing portion 102 will be described with reference to FIGS. 16 and 17. The distribution restricting device 30 is provided to a card guide 107 of the card guiding portion 105 which guides the card 1 extracted one by one from the opening portion 106 in the front side of the card containing portion 102 onto the gaming table 4. The distribution restricting device 30 has a structure where, when the card 1 passes through a slot 33 between the card guiding portion 105 and the guide cover of the card guide 107, a lock member 34 presses the card 1 to prevent the entering and exiting of the card 1 in the slot 33. The lock member 34 is moved by a driving unit 35 such as an electronic solenoid or a piezoelectric device as illustrated by an arrow m so as to take two states of a position (limiting position) of pressing the card 1 and a pass enabling position of enabling the card 1 to pass. The driving unit 35 is controlled by a control unit 109 which is directly or indirectly connected to the control device 14 in a wired or wireless manner to move the lock member 34 to the two states of the position of pressing the card 1 and the pass enabling position of enabling the card 1 to pass. The rule of the baccarat game is programmed and stored in advance in the control unit 109.

Figure 18A:
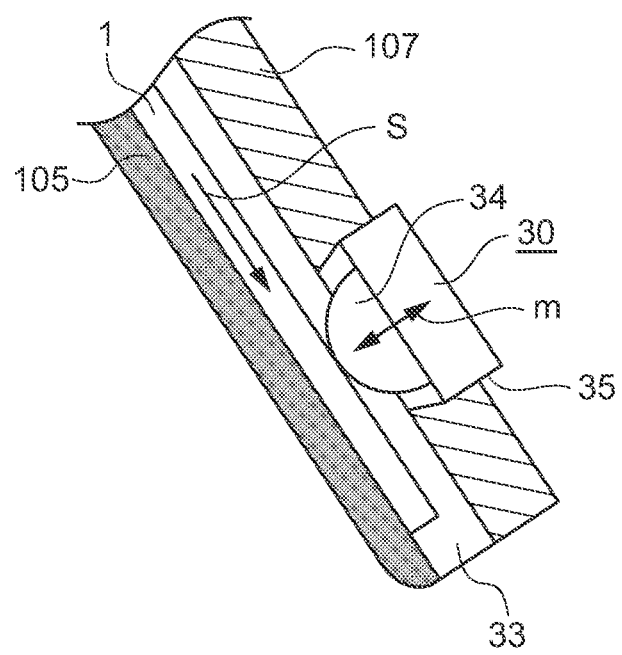
FIG. 18A is a side cross-sectional diagram illustrating main components of a modified example of the distribution restricting device which restricts entering and exiting of cards from a card containing portion of the card distribution device in the second embodiment of the invention.
Figure 18B:
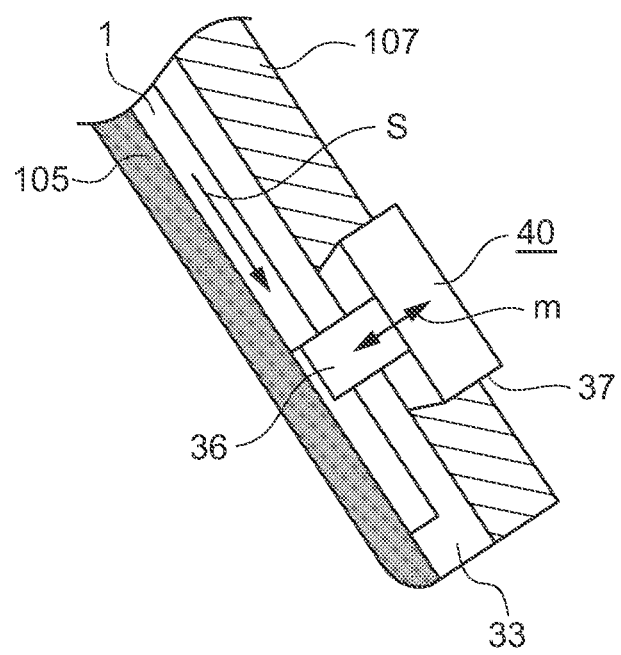
FIG. 18B is a side cross-sectional diagram illustrating main components of a distribution restricting device which restricts entering and exiting of cards from a card containing portion of the card distribution device in the second embodiment of the invention.

Next, a modified example of the distribution restricting device 30 will be described with reference to FIG. 18B. In the modified example, the distribution restricting device 40 has a structure where, when the card 1 passes through the slot 33 between the card guiding portion 105 and the card guide 107 (guide cover), the lock member 36 projects into the slot 33 to prevent the movement of the card 1. The lock member 36 is moved by a driving unit 37 such as an electronic solenoid or a piezoelectric device as illustrated by an arrow m so as to take two states of a position (limiting position) of preventing the movement of the card 1 and a pass enabling position of enabling the card 1 to pass. The driving unit 37 is controlled by the control unit 109 which is connected to the control device 14 to move the lock member 36 to the two states of the position of preventing the movement of the card 1 and the pass enabling position of enabling the card 1 to pass.

Next, details of the code reading unit 108 which reads a code 52 representing a digit (number, rank) of the card 1 from the card 1 when the card 1 is manually extracted from the card containing portion 102 will be described. FIG. 17 is a plan diagram illustrating main components of the card distribution device 3. In the figure, the code reading unit 108 is provided to the card guiding portion 105 which guides the card 1 manually extracted one by one from the opening portion 106 in the front side of the card containing portion 102 onto the gaming table 4. The card guiding portion 105 is formed to have a slanted surface, and the card guides 107 functioning as a sensor cover are provided to two edges of the card guiding portion. In addition, each of the two card guides 107 is formed detachable by using a screw or the like (not shown). If the card guides 107 are detached, sensor groups 115 of the code reading unit 108 are exposed. The sensor group 115 is configured with four sensors including two UV-ray sensitive sensors (UV sensors) 20 and 21 and object detection sensors 22 and 23.

The object detection sensors 22 and 23 are optical-fiber type sensors of detecting the existence of the card 1 and can detect the movement of the card 1. One object detection sensor 22 is located at the upstream side of the card guiding portion 105 in the card 1 flowing direction, and the other object detection sensor 23 is located at the downstream side. As illustrated in the figure, the two object detection sensors 22 and 23 are provided at the respective upstream and downstream sides to interpose the UV sensors 20 and 21. The UV sensors 20 and 21 have LEDs (UV LEDs) emitting a UV ray and sensors. A mark M of the code 52 is printed on the card 1 by using UV ray emitting ink which exhibits color if the ink is hit by the UV ray. By irradiating the card 1 with the UV ray (black light), reflected light of the mark M of the code 52 of the card 1 is sensed by the sensor. The UV sensors 20 and 21 are connected to the code reading unit 108 and the control unit 109 through cables. In the code reading unit 108, a combination of the marks M is determined and the number (rank) corresponding to each code 52 is determined from the output signal of the sensors, that is, the UV sensors 20 and 21.

In the code reading unit 108, starting and ending of the UV sensors 20 and 21 are controlled by the control unit 109 based on the detection signals of the object detection sensors 22 and 23. In addition, the control unit 109 determines based on the detection signals of the object detection sensors 22 and 23 whether or not the card 1 passes through the card guiding portion 105 normally. As illustrated in FIG. 19, two rows and four columns of the rectangular marks M representing the rank (number) and suit (heart, spade, or the like) of the card are arranged in the edge of the card 1. If the UV sensors 20 and 21 sense the mark M, the sensors output "on" signals. The code reading unit 108 determines a relative relationship between the two signals input from the two UV sensors 20 and 21. Therefore, the code reading unit 108 specifies the code according to a relative difference between the two marks M sensed by the two UV sensors 20 and 21 to specify the number (rank) and type (suit) of the corresponding card 1.

The relationship between the code 52 and the outputs of the "on" signals of the two UV sensors 20 and 21 is illustrated in FIG. 19. Based on the result of comparison of the relative change of the outputs of the "on" signals of the UV sensors 20 and 21, a predetermined combination of the marks M can be specified. As a result, four combinations of the marks M of the up and down two columns are obtained, and if the four combinations are printed in four columns, 4 to the 4th power, that is, 256 types of codes can be configured. By assigning 52 types of cards of the trump cards to 256 types of the codes, details of the assignment is stored as a comparison table in a memory or as a program, and the code reading unit 108 is configured so that, by specifying each code 52, the number (rank) and type (suit) of the card 1 is specified from a pre-defined comparison table (not shown). In addition, since the 256 types of the codes are stored in the comparison table in a manner that the codes are freely combined to be in association with the 52 types of the cards, the combinations may be complicated, and thus, the combinations of the 256 types of the codes and the 52 types of the card can be changed according to time and location. It is preferable that the code is printed by using a paint which is visualized by being irradiated with UV light and the code is printed at a position where the codes do not overlap a type indicator or index 103 of the card.

In addition, in the above-described embodiment, although the image analyzing apparatus 12 or the control device 14 is a device having an artificial intelligence utilizing type structure or a deep learning structure, specifically, the image analyzing apparatus 12 or the control device 14 may perform image analysis or the above-described various controls by using scale-invariant feature transform (SIFT) algorithm, convolution neutral network (CNN), deep learning, machine learning, or the like. Such a technique is a technique of performing image recognition on a captured image to recognize an object included in the image. Particularly, in recent years, object recognition at high accuracy is performed by using a deep learning technique utilizing a multilayered neutral network. In the deep learning technique, generally, layers covering multiple stages are overlapped in intermediate layers between an input layer and an output layer of the neutral network, so that the object is recognized at high accuracy. In the deep learning technique, particularly, a convolution neutral network has drawn attention because the convolution neutral network has higher performance than the object recognition based on image feature amounts in the related art.

In the convolution neutral network, recognition object images attached with label are learned, and main objects included in the recognition object image are recognized. In the case where a plurality of the main objects exist in the learned image, an area rectangle is specified, and the image corresponding to the specified area is attached with a label and the learning is performed. In addition, in the convolution neutral network, the main objects in the image and the positions of the objects can also be determined.

As the convolution neutral network is described more in detail, in the object recognition process, edge extraction process and the like is performed on the recognition object image, candidate areas are extracted based on localized features, the candidate areas are input to the convolution neutral network to extract feature vectors, classification is performed, and the candidate area having the highest degree of certainty among the classified candidate areas is acquired as a result of the recognition. The degree of certainty is a quantity representing how higher a degree of similarity between a certain image area and a subject of the image learned together with the label is than the degree of similarity of another class.

In addition, devices having an artificial intelligence utilizing type structure or a deep learning structure are disclosed in U.S. Pat. No. 9,361,577; US Publication No. 2016/0171336, US Publication No. 2015/0036920, JP Publication No. 2016-110232, and these disclosures are incorporated into this specification by reference.

Heretofore, although various embodiments of the invention are described, the above-described embodiments can be modified within the scope of the invention by the skilled in the art, and if needed in a game to which the embodiment is applied, the apparatus according to the embodiment may be appropriately modified.

REFERENCE SIGNS LIST

1 Playing card
1*a* Plurality of shuffle playing cards
2 Surveillance camera
3 Card distribution device
4 Gaming table
5 Dealer
6 Player (game participant)
7 Seat
8 Betting area
9 Chip
10 Area
10P Player area
10B Banker area
11 Game recording apparatus
12 Image analyzing apparatus
13 Result display lamp
14 Control device
14C Card distribution sensing device
15 Output (abnormality determination result or the like)
16 Abnormality display lamp
30 Distribution restricting device
33 Slot
34 Lock member
35 Driving unit
36 Lock member
37 Driving unit
40 Distribution restricting device
102 Card containing portion
103 Index
105 Card guiding portion
106 Opening portion
107 Card guide
109 Control unit
112 Side monitor

The invention claimed is:

1. A management system comprising:
a camera system including at least one camera,
the at least one camera is positioned raised from a top surface of a game table and oriented so that a respective direction from the camera to a respective focal point of the camera is oblique relative to the top surface of the game table, wherein the camera system is configured to record a progress of each of one or more of a plurality of games played at the game table as a respective set of one or more images generated by the at least one camera; and
a control device, wherein the control device is configured to:
perform image analysis on the respective sets of one or more images to recognize respective positions, types, and numbers of chips on the game table wagered in the respective one or more of the plurality of games;
perform the recognizing of the respective positions, types, and numbers of the chips in the respective one or more of the plurality of games using artificial intelligence technology or machine learning technology; and
recognize an amount and history of the wagered chips at timings of each lapse of a predetermined number of the plurality of games.

2. The management system according to claim 1, wherein:
the game table includes a plurality of predefined betting areas; and
the recognition of the positions of the chips on the game table includes identifying in which respective ones of the plurality of predefined betting areas the respective chips are positioned.

3. The management system according to claim 2, wherein the recognition of the respective positions of the respective chips in the respective predefined betting areas is performed using the artificial intelligence technology or machine learning technology based on a respective viewing angle of the at least one camera.

4. The management system according to claim 1, wherein the at least one camera includes a plurality of cameras.

5. The management system according to claim 1, wherein the control device is configured to:
recognize respective amounts of increase/decrease of chips in the respective games calculated from a win or lose result of the respective game;
recognize a respective history within the respective game; and
recognize a respective history of win or lose and amounts of income/expenditure at the timings of each lapse of the predetermined number of the plurality of games.

6. The management system according to claim 5, further comprising a win or lose result determining device, wherein the win or lose result determining device is configured to determine the respective win or lose result of the respective games used by the control device for the calculation.

7. The management system according to claim 1, wherein the control device is configured to:
identify a strange situation in which an amount of the wagered chips, a winning amount, and/or a win and lose history is strange compared to statistical data; and
output an indication of the identified strange situation.

8. The management system according to claim 7, wherein the strange situation is at least one of:
1) a situation in which the winning amount is more than a predetermined amount;
2) a situation in which a state, in which an amount of the wagered chips at a time of loss is small and an amount of the wagered chips at a win time is large, continues for several games in a manner that is statistically anomalous compared with statistical data;
3) a situation in which an actual winning amount is strange compared to an average winning amount statistically expected based on a history of wagered amounts;
4) a situation in which a respective position of the wagered chips and a respective amount of the chips that obtained by a player are strange compared with statistical data; or
5) a situation in which a winning rate when an amount of the wagered chips is more than a predetermined amount is strange compared with statistical data.

9. The management system according to claim 1, wherein:
the chips whose respective positions, types, and number the control device is configured to recognize are wagered by one or more players placed at respective playing positions of the game table, in the respective one or more of the plurality of games; and
the control device is configured to identify each of the one or more players and associate the recognized positions, types, and numbers of the chips with the respective identified one or more players.

10. The management system according to claim 9, wherein the identification of the each of the one or more players includes providing each of the one or more players with a respective identification number.

11. The management system according to claim 10, wherein the control device is configured to associate respective ones of the chips on the game table with the respective identification numbers of the respective players who bet the respective chips.

12. The management system according to claim 9, wherein the control device is configured to perform the recognition of the amount and history of the wagered chips respectively for each of the one or more players.

13. The management system according to claim 12, wherein the control device is further configured to recognize a total amount and history of the wagered chips in the one or more of the plurality of games.

14. The management system according to claim 9, wherein the identification of the each of the one or more players by the control device includes extracting respective face images of the players, from the respective sets of the one or more image, using the artificial intelligence technology or machine learning technology.

15. The management system according to claim 9, wherein the control device is configured to:
recognize respective amounts of increase/decrease of chips of the respective players in the respective games calculated from a win or lose result of the respective game;
recognize a respective history within the respective games; and
recognize a respective history of win or lose and amounts of income/expenditure of the respective players at the timings of each lapse of the predetermined number of the plurality of games.

16. The management system according to claim 15, further comprising a win or lose result determining device which determines the respective win or lose result of each of the plurality of games used by the control device for the calculation.

17. The management system according to claim 1, wherein the control device is configured to:
identify an individual one of the identified players as being in a strange situation in which an amount of the wagered chips, a winning amount, and/or a win and lose history is strange compared to statistical data; and
output an indication of an existence of the identified individual player being in the strange situation.

18. The management system according to claim 17, wherein the strange situation is at least one of:
1) a situation in which the winning amount is more than a predetermined amount;
2) a situation in which a state, in which an amount of the wagered chips at a time of loss is small and an amount of the wagered chips at a win time is large, continues for several games in a manner that is statistically anomalous compared with statistical data;
3) a situation in which an actual winning amount of a respective player of the one or more players is strange compared to an average winning amount statistically expected based on history of wagered amounts;
4) a situation in which a respective position of the chips wagered by a respective one of the players and a respective amount of the chips obtained by the respective player are strange compared with statistical data; or 5) a situation in which a winning rate when an amount of the wagered chips is more than a predetermined amount is strange compared with statistical data.

19. The management system according to claim 1, wherein the game table includes a plurality of predefined sitting positions which the management system is configured to associate with respective players.

20. The management system according to claim 19, wherein the control device is configured to perform the recognition of the positions, types, and numbers of the chips respectively for each of sitting positions, associating respective ones of the chips with respective ones of the sitting positions.

21. The management system according to claim 20, wherein a first one of the sitting positions is closer to the at least one camera than a second one of the sitting positions, and the control device is configured to perform the recognition of the respective positions, types, and numbers of the chips even when chips in the second one of the sitting positions are at least partially obscured from view of the at least one camera by chips in the first one of the sitting positions.

22. The management system according to claim 1, wherein the recognition of the respective positions, types, and numbers of the chips occurs even if chips in a first area of the game table are at least partially obscured from view of the at least one camera by chips in a second area of the game that is closer to the at least one camera than the first area of the game table.

23. The management system according to claim 1, wherein the control device is configured to perform the recognition of the respective positions, types, and numbers of the chips even when the chips are arranged in a plurality of stacks one behind another in a depth direction from the at least one camera.

24. A management system comprising:
a camera system including at least one camera,
the at least one camera is positioned raised from a top surface of a game table and oriented so that a respective direction from the camera to a respective focal point of the camera is oblique relative to the top surface of the game table, wherein the camera system is configured to record a progress of each of one or more of a plurality of games played at the game table as a respective set of one or more images generated by the at least one camera; and
an image analyzing apparatus, wherein the image analyzing apparatus is configured to perform image analysis on the respective sets of one or more images of the recorded progress of the respective games; and
a control device;
wherein the control device is configured to:
recognize respective positions, types, and numbers of chips on the game table wagered in the respective one or more of the plurality of games, the recognition being through use of the image analyzing apparatus;
perform the recognizing of the respective positions, types, and numbers of the chips in the respective one or more of the plurality of games using artificial intelligence technology or machine learning technology; and
recognize an amount and history of the wagered chips at timings of each lapse of a predetermined number of the plurality of games.

25. A management system comprising:
a game recorder; and
a processor;
wherein:
the game recorder includes at least one camera;
the at least one camera is positioned raised from a top surface of a game table and oriented so that a respective direction from the camera to a respective focal point of the camera is oblique relative to the top surface of the game table;
the game recorder is configured to record a progress of each of one or more of a plurality of games played at the game table as a respective set of one or more images generated by the at least one camera; and
the processor is configured to:
use artificial intelligence technology or machine learning technology to perform image analysis on the respective sets of one or more images to identify respective positions, types, and amounts of wagered chips on the game table; and
determine a respective total amount of chips wagered in each of the plurality of games and a respective history of the wagering of the chips at timings when each set of a predetermined number of the plurality of games have elapsed.

* * * * *